(12) United States Patent
Katayama et al.

(10) Patent No.: US 6,884,131 B2
(45) Date of Patent: Apr. 26, 2005

(54) SHIFT MECHANISM FOR MARINE PROPULSION UNIT

(75) Inventors: Goichi Katayama, Shizuoka (JP); Masanori Takahashi, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/346,320

(22) Filed: Jan. 16, 2003

(65) Prior Publication Data

US 2003/0224671 A1 Dec. 4, 2003

(30) Foreign Application Priority Data

Jan. 16, 2002 (JP) .................................... 2002-008045
Jan. 16, 2002 (JP) .................................... 2002-008048

(51) Int. Cl.$^7$ ................................................ B63H 23/26
(52) U.S. Cl. ........................................................ 440/75
(58) Field of Search ............................. 440/75; 192/21, 192/51, 58.2–58.9

(56) References Cited

U.S. PATENT DOCUMENTS

| 2,542,682 | A | * | 2/1951 | Kloss ............................ 416/32 |
| 3,216,392 | A | * | 11/1965 | Shimanckas .................. 440/75 |
| 3,217,688 | A | * | 11/1965 | Warburton, II ............... 440/58 |
| 3,362,375 | A | * | 1/1968 | Shimanckas .................. 440/75 |
| 3,368,420 | A | * | 2/1968 | Alexander, Jr. ............... 74/410 |
| 4,579,204 | A |   | 4/1986 | Iio |
| 5,006,084 | A |   | 4/1991 | Handa |
| 5,445,546 | A |   | 8/1995 | Nakamura |
| 5,556,312 | A |   | 9/1996 | Ogino |
| 5,556,313 | A |   | 9/1996 | Ogino |
| 5,766,047 | A | * | 6/1998 | Alexander et al. ............ 440/81 |
| 5,788,546 | A |   | 8/1998 | Ogino |
| 5,839,928 | A |   | 11/1998 | Nakayasu et al. |
| 6,123,591 | A |   | 9/2000 | Onoue |
| 6,322,407 | B1 |   | 11/2001 | Onoue |

FOREIGN PATENT DOCUMENTS

JP        7-81684         3/1995

OTHER PUBLICATIONS

Co–pending U.S. Appl. No. 09/606,622 filed Jun. 29, 2000 in the name of Akihiro Onoue et al.

* cited by examiner

Primary Examiner—Sherman Basinger
(74) Attorney, Agent, or Firm—Knobbe, Martens, Olson & Bear, LLP

(57) ABSTRACT

An outboard motor incorporates a driveshaft and a propulsion shaft driven by the driveshaft. The driveshaft carries a pinion. The propulsion shaft carries forward and reverse gears. The pinion always meshes with the forward and reverse gear and drives the forward and reverse gears in opposite directions relative to each other. A hydraulic forward clutch mechanism couples the forward gear with the propulsion shaft. A hydraulic reverse clutch mechanism couples the reverse gear with the propulsion shaft. A shift actuator selectively operates the forward clutch mechanism or the reverse clutch mechanism to provide forward, reverse and/or neutral running conditions for the outboard motor.

25 Claims, 15 Drawing Sheets

SHIFT MECHANISM FOR MARINE PROPULSION UNIT

PRIORITY INFORMATION

This application is based on and claims priority to Japanese Patent Applications No. 2002-008045, filed on Jan. 16, 2002, and No. 2002-008048, filed on Jan. 16, 2002, the entire contents of which are hereby expressly incorporated by reference.

BACKGROUND OF THE INVENTION

1. Field of the Invention

The present invention generally relates to a shift mechanism for a marine propulsion unit, and more particularly relates to an improved shift mechanism for a marine propulsion unit that shifts a transmission of the propulsion unit among, for example, forward, neutral and reverse positions.

2. Description of Related Art

Marine propulsion units such as outboard motors incorporate an engine as a prime mover to power a marine propulsion device. The propulsion device typically is a propeller and is submerged when an associated watercraft rests on a body of water. The engine typically is placed atop the outboard motor. A drive train and a transmission couple the engine with the propulsion device. Typically, the engine has a crankshaft extending generally vertically. The drive train includes a driveshaft disposed within a housing unit below the engine. The driveshaft also extends generally vertically and is connected to the crankshaft to transfer the power of the engine to a propeller shaft which also is included in the drive train. The transmission couples the propeller shaft with the driveshaft.

The outboard motor can incorporate a shift mechanism that shifts the transmission among forward, neutral and reverse positions. The propeller rotates in a direction such that the associated watercraft proceeds forward when the transmission is in the forward position, while the propeller rotates in another direction such that the watercraft proceeds backward when the transmission is in the reverse position. Otherwise, the propeller does not rotate when the transmission is in the neutral position because the propeller shaft is decoupled from the driveshaft in this position.

Typically, the shift mechanism incorporates a dog clutch assembly that operates with a gear set. The driveshaft carries a pinion of the gear set at the shaft's bottom end. The propeller shaft carries forward and reverse gears that always mesh with the pinion. The dog clutch assembly is slidably disposed between the forward and reverse gears on the propeller shaft and is coupled with the propeller shaft so as to rotate together with the propeller shaft. A mechanical shift actuator selectively connects the dog clutch assembly either with the forward gear or the reverse gear, or disconnects the dog clutch assembly from both the forward and reverse gears. Because the dog clutch assembly is coupled with the propeller shaft, the propeller shaft rotates in the forward propelling direction when connected with the forward gear, while the propeller shaft rotates in the reverse propelling direction when connected with the reverse gear. Otherwise, the propeller shaft does not rotate when the dog clutch assembly is not connected with either of the gears. The shift mechanisms incorporating such a dog clutch assembly are disclosed, for example, in U.S. Pat. Nos. 4,579,204, 5,006, 084, 5,445,546, 5,556,312, 5,556,313, 5,788,546, 5,839,928 6,123,591.

The conventional shift mechanisms can shift the transmission among the forward, reverse and neutral positions in an instant because the dog clutch assembly is instantaneously connected or disconnected with the forward or reverse gear. This action, however, can produce significant shock and noise. The shock and/or noise that occurs when the transmission is shifted to either the forward or reverse positions during idle can bother or alarm (somewhat unsettle) an operator of the outboard motor or the passengers on the watercraft. The problem is more noticeable in connection with four cycle engines because the four cycle engines normally provide stable (smooth), quite operation at idle speed.

SUMMARY OF THE INVENTION

A need therefore exists for an improved shift mechanism for a marine propulsion unit that can reduce a shock and noise that occurs when a transmission is shifted to either a forward or reverse operating condition.

In accordance with one aspect of the present invention, a marine propulsion unit comprises a prime mover. A first shaft is driven by the prime mover. A second shaft is driven by the first shaft. The second shaft drives a propulsion device. The first shaft carries a first gear. The second shaft carries second and third gears. The first gear always meshes with the second and third gears. The first gear drives the second and third gears in opposite directions relative to each other. A first hydraulic clutch mechanism is configured to couple the second gear with the second shaft. A second hydraulic clutch mechanism is configured to couple the third gear with the second shaft. A hydraulic control system selectively operates either the first hydraulic clutch mechanism or the second hydraulic clutch mechanism.

In accordance with another aspect of the present invention, a marine propulsion unit comprises a prime mover. A first shaft is driven by the prime mover. The first shaft extends generally vertically. A second shaft is driven by the first shaft. The second shaft extends generally horizontally. The second shaft drives a propulsion device. The first shaft carries a first gear. The second shaft carries second and third gears both always meshing with the first gear. The first gear drives the second and third gears in opposite directions relative to each other. A first hydraulic clutch mechanism selectively connects or disconnects the second gear with the second shaft. A second hydraulic clutch mechanism selectively connects or disconnects the third gear with the second shaft. The first and second hydraulic clutch mechanisms together interpose the second and third gears therebetween.

An additional aspect of the present invention involves a marine propulsion unit comprising a first shaft and a second shaft that the first shaft selectively drives. The second shaft in turn drives a propulsion device. The first shaft carries a first gear that continuously drives a second gear. A hydraulic clutch mechanism operates between the second gear and the second shaft so as to drivingly couple the second gear with the second shaft. A hydraulic control system selectively actuates the hydraulic clutch mechanism.

BRIEF DESCRIPTION OF THE DRAWINGS

These and other features, aspects and advantages of the present invention are described below with reference to the drawings of preferred embodiments, which are intended to illustrate and not to limit the invention. The drawings comprise 16 FIGS.

DETAILED DESCRIPTION OF THE PREFERRED EMBODIMENTS

Figure 1:
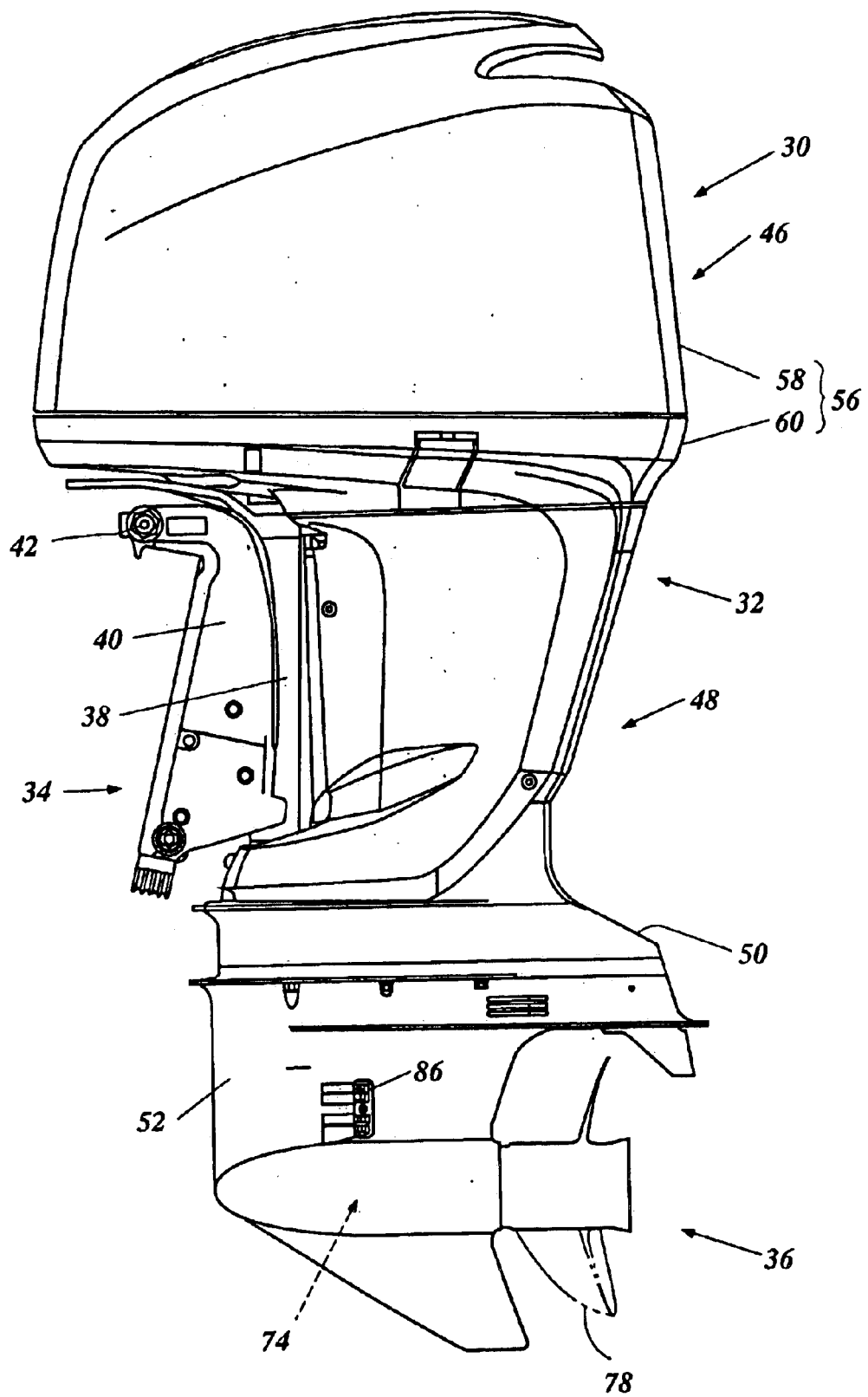
FIG. 1 is a side elevational view of an outboard motor configured in accordance with a preferred embodiment of the present invention.

With reference to FIG. 1, an overall construction of an outboard motor 30 configured in accordance with certain features, aspects and advantages of the present invention is described below. The outboard motor merely exemplifies one type of marine propulsion unit on which various aspects and features of the present invention can be suitably used. Other types of marine propulsion units such as, for example, outboard drives or stem drives for inboard/outboard systems can employ various features, aspects and advantages of the present invention. Such applications will be apparent to those of ordinary skill in the art in light of the description herein.

The outboard motor 30 generally comprises a drive unit 32, a bracket assembly 34, and a propulsion device 36. The bracket assembly 34 supports the drive unit 32 on a transom of an associated watercraft and places the propulsion device 36 in a submerged position when the watercraft rests on a surface of a body of water. The bracket assembly 34 preferably comprises a swivel bracket 38, a clamping bracket 40, a steering shaft and a pivot pin 42.

The steering shaft typically extends through the swivel bracket 38 and is affixed to the drive unit 32. The steering shaft is pivotally journaled for steering movement about a generally vertically extending steering axis defined within the swivel bracket 38. The clamping bracket 40 comprises a pair of bracket arms that are spaced apart from each other and that are affixed to the watercraft transom. The pivot pin 42 completes a hinge coupling between the swivel bracket 38 and the clamping bracket 40. The pivot pin 42 extends through the bracket arms so that the clamping bracket 40 supports the swivel bracket 38 for pivotal movement about a generally horizontally extending tilt axis defined by the pivot pin 42. The drive unit 32 thus can be tilted or trimmed about the pivot pin 42.

As used through this description, the terms "forward," "forwardly" and "front" mean at or toward the side where the bracket assembly 34 is located, and the terms "rear," "reverse," "backward" and "rearward" mean at or toward the opposite side of the front side, unless indicated otherwise or otherwise readily apparent from the context use.

A hydraulic tilt and trim adjustment system preferably is provided between the swivel bracket 38 and the clamping bracket 40 for tilt movement (raising or lowering) of the swivel bracket 38 and the drive unit 32 relative to the clamping bracket 40. Otherwise, the outboard motor 30 can have a manually operated system for tilting the drive unit 32. Typically, the term "tilt movement," when used in a broad sense, comprises both a tilt movement and a trim adjustment movement.

The illustrated drive unit 32 comprises a power head 46 and a housing unit 48. The housing unit 48 includes a driveshaft housing 50 and a lower unit 52.

The power head 46 is disposed atop the drive unit 32 and includes a prime mover. In the illustrated embodiment, the prime mover is an internal combustion engine (not shown) housed with a protective cowling assembly 56 of the power head 46. The engine preferably is a water-cooled, four-cycle engine. This type of engine, however, merely exemplifies one type of engine and any types of engine can be applied. The protective cowling assembly 56 preferably comprises top and bottom cowling members 58, 60, which are detachably coupled with each other.

The top cowling member 56 preferably has a rear intake opening on its rear and top portion. Ambient air thus is drawn into a closed cavity defined by the cowling assembly 56 through the rear intake opening.

The bottom cowling member 58 preferably has an opening through which an upper portion of a support member extends. The support member preferably is affixed atop the driveshaft housing 50. The bottom cowling member 58 and the support member together generally form a tray. The engine is placed onto this tray and is affixed to the support member.

A crankshaft extends generally vertically through a crankcase of the engine. The crankshaft rotates with the reciprocal movement of one or more pistons. The pistons reciprocate within cylinder bores when air/fuel charges are burnt in respective combustion chambers. The air and the fuel are supplied to the combustion chambers through an air intake system and a fuel supply system, respectively. Preferably, the air in the closed cavity of the protective cowling assembly 56 is drawn into the combustion chambers through the air intake system. The fuel supply system can include a direct or indirect fuel injection device. Otherwise, the fuel supply system can include a carburetor. An exhaust system is provided to route the burnt charges (e.g., exhaust gases) from the combustion chambers to an external location. The support member defines an exhaust passage through which the exhaust gases move to the driveshaft housing 50.

With continued reference to FIG. 1 and additional reference to FIGS. 2–4, the driveshaft housing 50 is disposed below the power head 46 and the lower unit 52 depends from the driveshaft housing 50. A driveshaft 62 extends generally vertically through the driveshaft housing 50 and the lower unit 52. A center axis 63 of the driveshaft 62 (FIGS. 2 and 6) preferably extends on and along an imaginary vertical center plane CP (FIG. 6) that extends fore to aft in the center of the outboard motor 30. Bearings such as, for example, a radial bearing 64 (FIG. 4), journal the driveshaft 62. The driveshaft 62 is coupled with the crankshaft in a conventional manner to be driven by the engine.

The driveshaft housing 50 preferably defines an internal section of the exhaust system that guides the majority of exhaust gases from the exhaust passage of the support member to the lower unit 52. The illustrated driveshaft housing 50 forms an expansion chamber 68 (FIGS. 2 and 4) in the rear of the driveshaft 62. An idle discharge section preferably branches off the internal section to discharge idle exhaust gases directly to the atmosphere through a discharge port. The discharge port is formed at the rear of the driveshaft housing 50.

The lower unit 52 journals a propulsion shaft 72. The propulsion shaft 72 extends horizontally through the lower unit 52 and lie generally normal to the driveshaft 62 (i.e., at a 90° shaft angle). The propulsion shaft 72 has a center axis 73 (FIGS. 2 and 6) that preferably extends on and along the center plane CP. The propulsion shaft 72 is coupled with the driveshaft 62 through a transmission 74 and is driven by the driveshaft 62. In the illustrated arrangement, a shaft housing or bearing carrier 76, which is affixed within the lower unit 52, journals a rear portion of the propulsion shaft 72. The propulsion device 36 is mounted on the propulsion shaft 72 to rotate with the propulsion shaft 72. In the illustrated arrangement, the propulsion device 36 includes a propeller 78 that is affixed to an outer end of the propulsion shaft 72. The propulsion device, however, can take the form of a dual counter-rotating system, a hydrodynamic jet, or any of a number of other suitable propulsion devices. The propeller 78 can rotates in either direction with the transmission 74 being either in a forward or reverse operating state. The operating states of the transmission 74 will be described in greater detail below.

The lower unit 52 also defines another internal section of the exhaust system that is connected with the internal section of the driveshaft housing 50. In the illustrated arrangement, the internal section includes an exhaust passage or second expansion chamber 82 formed behind the driveshaft 62. The illustrated propeller 78 defines a discharge section 83 of the exhaust system around a hub portion thereof. The shaft housing 76, together with the inner surface of the lower unit 52, forms a passageway 84 that connects to the exhaust passage 82 and the discharge section 83. A seal member 85 is provided at the rear-most end of the shaft housing 76 and between an outer surface of the propulsion shaft 72 and an inner surface of the shaft housing 76 to isolate the exhaust system from the transmission 74.

At engine speeds above idle, the exhaust gases generally are discharged to the body of water surrounding the outboard motor 30 through the expansion chambers 68, the exhaust passage 82, the passageway 84 and the discharge section 83; however, other constructions and arrangements of the exhaust system are practicable.

Figure 2:
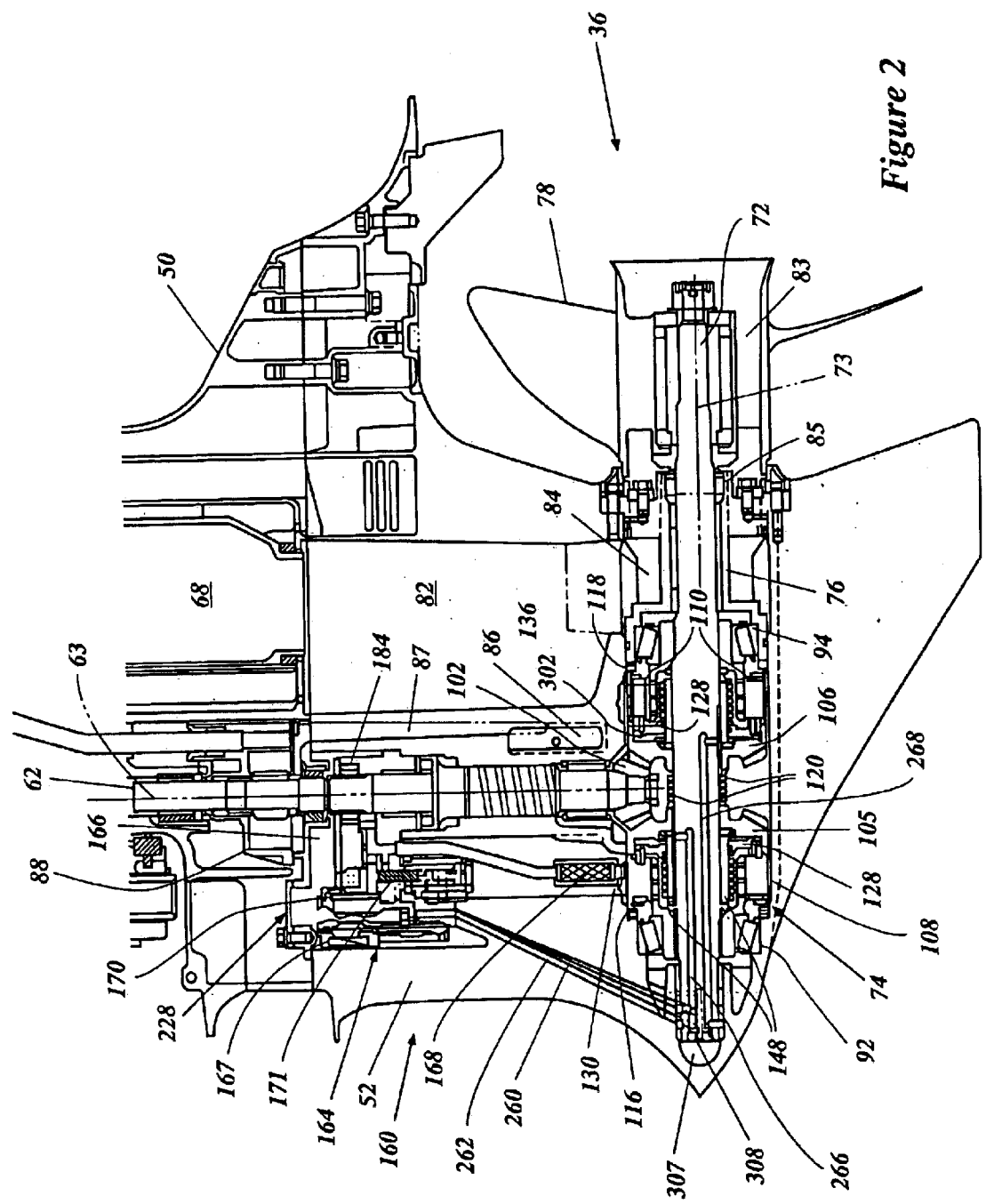
FIG. 2 is a schematic, sectional side elevational view of a housing unit lower portion of the outboard motor of FIG. 1. In particular, the FIG. illustrates an upper portion of a lower unit and a lower section of a drive shaft housing of the outboard motor's housing unit.
Figure 4:
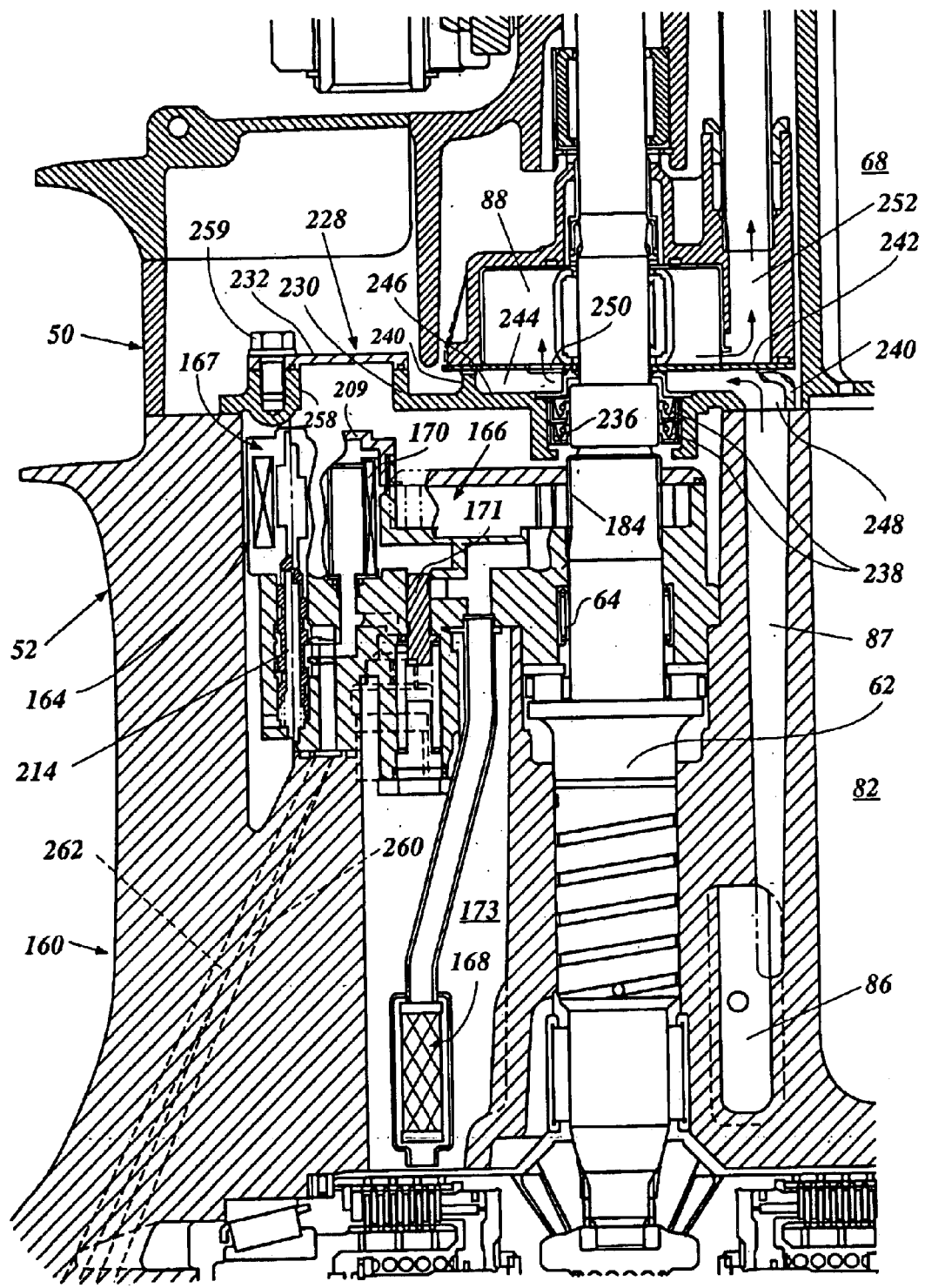
FIG. 4 is an enlarged sectional view of the driveshaft housing of the outboard motor of FIG. 1 showing a hydraulic control system and a cooling water supply system.

With reference to FIGS. 2 and 4, the outboard motor 30 is provided with a cooling water delivery system to cool the engine and the exhaust system. The water delivery system preferably is an open-loop type system that introduces water from the body of water surrounding the outboard motor 30 and delivers the water to the engine and the exhaust system and then discharges the water to the outside location.

The cooling water delivery system preferably comprises a water inlet 86, a water delivery passage, generally indicated by reference number 87, and a water pump 88. The water inlet 86 is disposed at either or both sides of the lower unit 52. The water delivery passage 87 delivers water to the engine and the exhaust system. The water delivery passage 87 includes water jackets in the engine and the exhaust system and also can include water pools surrounding some portions of the exhaust system. The water is drawn into the cooling system by the water pump 88 that is preferably driven by the driveshaft 62. At least a portion of the cooling water is mixed with the exhaust gas flow to silence the exhaust gases before discharge from the outboard motor.

Figure 3:
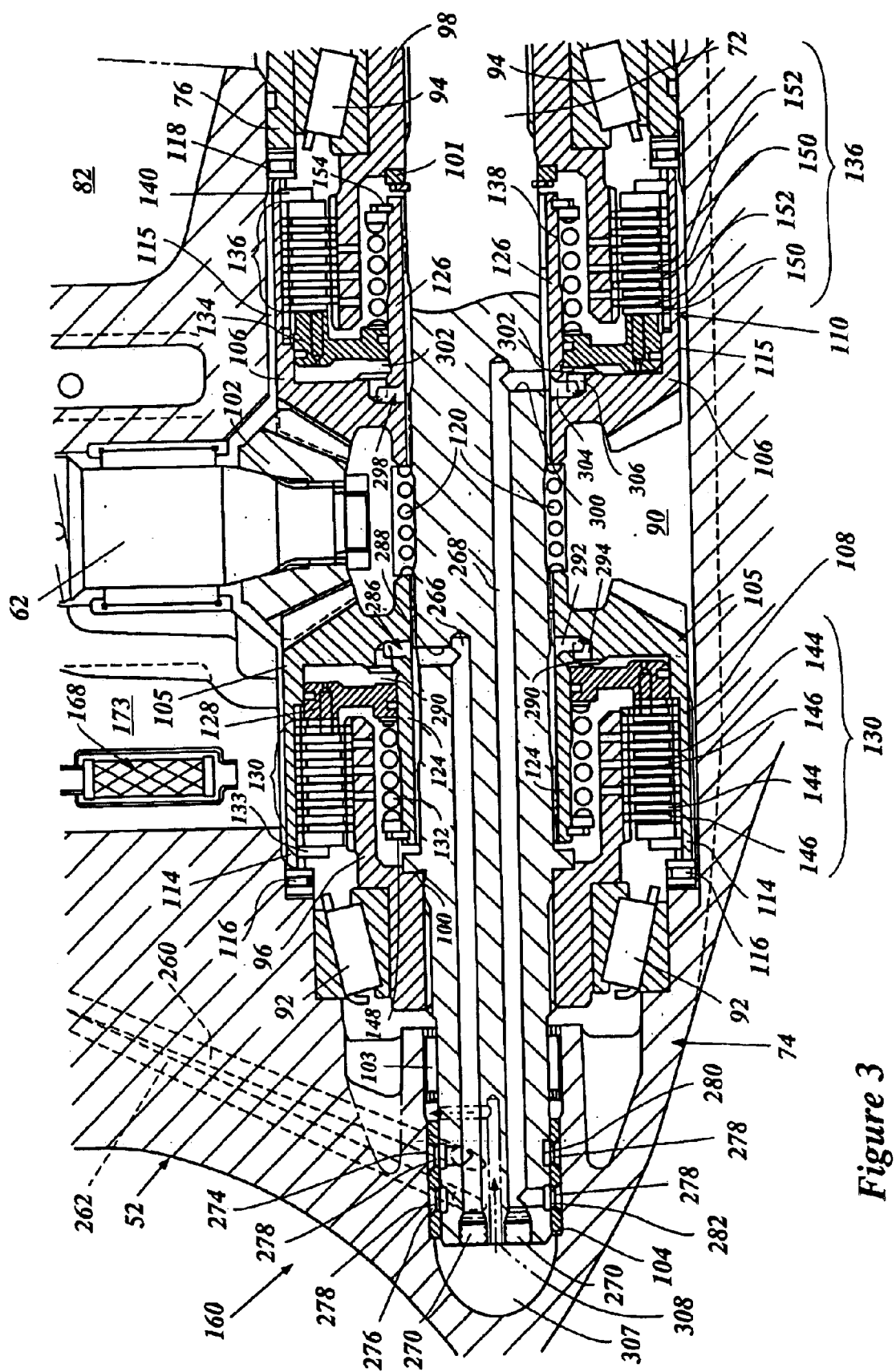
FIG. 3 is an enlarged sectional view of the housing unit lower portion of FIG. 2 showing a transmission and hydraulic clutch mechanisms.

With particular reference to FIG. 3, the transmission 74 will now be described in greater detail. A forward portion of the propulsion shaft 72 extends within a cavity 90 defined within the lower unit 52. Forward and rear thrust bearings 92, 94 journal the propulsion shaft 72. The forward thrust bearing 92 is placed at a recessed portion of the lower unit 52, while the rear thrust bearing 94 is placed at a recessed portion of the shaft housing 76. In the illustrated arrangement, a forward coupling member 96 is provided between the propulsion shaft 72 and the forward thrust bearings 92. Also, a rear coupling member 98 is provided between the propulsion shaft 72 and the rear thrust bearing 94. The coupling members 96, 98 are connected to the propulsion shaft 72 through a spline connection so as to rotate with the propulsion shaft 72. The forward coupling member 96 is interposed between an inner retainer of the thrust bearing 92 and a flange 100 formed around the propulsion shaft 72, while the reverse coupling member 98 is interposed between an inner retainer of the thrust bearing 94 and a circular clip 101 affixed around the propulsion shaft 72.

The propulsion shaft 72 can transmit a forward thrust force to the lower unit 52 through the flange 100, the forward coupling member 96 and the forward thrust bearing 92. The propulsion shaft 72 can also transmit the rear thrust force to the lower unit 52 through the circular clip 101, the forward coupling member 96, the forward thrust bearing 92 and the shaft housing 76.

A radial or needle bearing 103 also journals the propulsion shaft 72 in front of the thrust bearing 92. A cylindrical member 104 is disposed around a forward end of the propulsion shaft 72. Although the cylindrical member 104 can also journal the propulsion shaft 72, the cylindrical member 104 rather is provided to define fluid paths, which will be described below.

In the illustrated embodiment, the driveshaft 62 carries a drive pinion 102 at the bottom end thereof. The pinion 102 preferably is coupled with the driveshaft 62 through a spline connection. Forward and reverse driven gears 105, 106 are mounted on the propulsion shaft 72 so as to interpose the pinion 102 therebetween and to always mesh with the pinion 102. The forward and reverse gears 105, 106 can be coupled with the propulsion shaft 72 through forward and reverse hydraulic clutch mechanisms 108, 110, respectively. Unless the clutch mechanisms 108, 110 are actuated, the forward and reverse gears 105, 106 rotate about but do not drive the propulsion shaft 72 when the driveshaft 62 rotates. The forward and reverse gears 105, 106 rotate in opposite directions relative to one another.

In the illustrated arrangement, each of the forward and reverse gears 105, 106 have a dual cylindrical wall, cup-like shape with a gear formed at a closed-end portion of the cup-like shape. The forward gear 105 has an outer cylindrical section 114 extending forwardly, while the reverse gear 106 has an outer cylindrical section 115 extending rearward. A forward end of the outer cylindrical section 114 abuts on a thrust bearing 116, which is smaller than the thrust bearing 92 and is placed in a recessed portion of the lower unit 52. The thrust bearing 116 preferably is positioned slightly rearward relative to the thrust bearing 92 and has a slightly larger diameter than the thrust bearing 92. A rear end of the outer cylindrical section 115 abuts on a thrust bearing 118, which is smaller than the thrust bearing 94 and is placed at a forward end of the shaft housing 76. The thrust bearing 118 preferably is positioned slightly forward relative to the thrust bearing 94 and has a slightly larger diameter than the thrust bearing 94. A coil spring 120 mounted on the propulsion shaft 72 between the forward and reverse gears 105, 106 urges the forward and reverse gears 105, 106 toward the thrust bearings 116, 118, respectively.

The forward gear 105 has an inner cylindrical section 124 extending forwardly and parallel to the outer cylindrical section 114. The inner cylindrical section 124 has an inner diameter that is slightly larger than an outer diameter of the propulsion shaft 72. The reverse gear 106 also has an inner cylindrical section 126 extending rearward and parallel to the outer cylindrical section 115. The inner cylindrical section 126 has an inner diameter that is slightly larger than an outer diameter of the propulsion shaft 72.

In the illustrated arrangement, the forward hydraulic clutch mechanism 108 cooperates with the outer and inner cylindrical sections 114, 124 of the forward gear 105, while the reverse hydraulic clutch mechanism 110 cooperates with the outer and inner cylindrical sections 115, 126 of the reverse gear 106. The forward and reverse clutch mechanisms 108, 110 preferably are formed with a multiple-disc clutch. In this preferred embodiment, therefore, the forward clutch mechanism 108 further comprises a hydraulic piston 128, a disc unit 130, a bias spring 132 and a stopper 133, and the reverse clutch mechanism 110 further comprises a hydraulic piston 134, a disc unit 136, a bias spring 138 and a stopper 140.

In the arrangement of the forward clutch mechanism 108, the disc unit 130 comprises outer friction plates 144 and inner friction plates 146 that are alternately disposed between the outer cylindrical section 114 of the forward gear 105 and the forward coupling member 96. The outer friction plates 144 drivingly engage the outer cylindrical section 114 and the inner friction plates 146 drivingly engage the forward coupling member 96. While the friction plates rotate with their respectively engaged structures, the friction plates 144, 146 can slide axially (i.e., along the axis of the propulsion shaft 72) relative to the outer cylindrical section 113 and the forward coupling member 96 so as to be compressed together, as described below. The outer and inner friction plates 144, 146 can move axially. The stopper 133, which is positioned forwardly relative to the disc unit 130, is affixed to the outer cylindrical section 114 and does not move axially. The hydraulic piston 128 is positioned next to the disc unit 130 opposite to the stopper 133. The piston 128 is slidably supported by the forward gear 105 between the outer and inner cylindrical sections 114, 124. In other words, the piston 128 can move axially toward the disc unit 130 to press the disc unit 130 against the stopper 133. The bias spring 132 urges the piston 124 toward the opposite direction so that the piston 128 normally is positioned apart from the disc unit 130. A lower half of the piston 128 of FIG. 3 is illustrated to show the piston 128 being in this position. A retainer 148, which is affixed to the inner cylindrical section 124 of the forward gear 105, retains the bias spring 132.

In the arrangement of the reverse clutch mechanism 110, the disc unit 136 comprises outer friction plates 150 and inner friction plates 152, which line alternately between the outer cylindrical section 115 of the reverse gear 106 and the reverse coupling member 98. The outer friction plates 150 engage with the outer cylindrical section 115 and the inner friction plates 152 engage the reverse coupling member 98. The outer and inner friction plates 150, 152 can move axially. The stopper 140, which is positioned rearward relative to the disc unit 136, is affixed to the outer cylindrical section 115 and does not move axially. The hydraulic piston 134 is positioned next to the disc unit 136 opposite to the stopper 140. The piston 134 is slidably supported by the reverse gear 106 between the outer and inner cylindrical sections 115, 126. In other words, the piston 134 can move axially toward the disc unit 136 to press the disc unit 136 against the stopper 140. The bias spring 138 urges the piston 134 toward the opposite direction so that the piston 134 normally is positioned apart from the disc unit 136. A lower half portion of the piston 134 of FIG. 3 is illustrated to show the piston 134 being in this position. A retainer 154 affixed to the inner cylindrical section 126 of the reverse gear 106 retains the bias spring 138.

The pistons 128, 134 are hydraulically operated by a hydraulic control system 160, which will be described in greater detail below. When the piston 128 is moved toward the stopper 133 by the control system 160, the outer and inner friction plates 144, 146 of the disc unit 130 are all together pressed to the stopper 133. An upper half portion of the piston 128 of FIG. 3 is illustrated to show the piston 128 being in this position. The forward gear 105 thus can transmit the driving force to the forward coupling member 96 through the disc unit 130. The forward coupling member 96 rotates, accordingly. Because of being coupled with the forward coupling member 96 through the spline connection, the propulsion shaft 72 rotates and the propeller 78 affixed to the propulsion shaft 72 also rotates so that the outboard motor 30 advances forwardly.

In the meantime, when the piston 134 is moved toward the stopper 140 by the control system 160, the outer and inner friction plates 150, 152 of the disc unit 136 are all together pressed to the stopper 140. An upper half portion of the piston 134 of FIG. 3 is illustrated to show the piston 134 being in this position. The reverse gear 106 thus can transmit the driving force to the reverse coupling member 98 through the disc unit 136. The reverse coupling member 98 rotates, accordingly. Because of being coupled with the reverse coupling member 98 through the spline connection, the propulsion shaft 72 rotates and the propeller 78 also rotates so that the outboard motor 30 advances backward.

Figure 5:
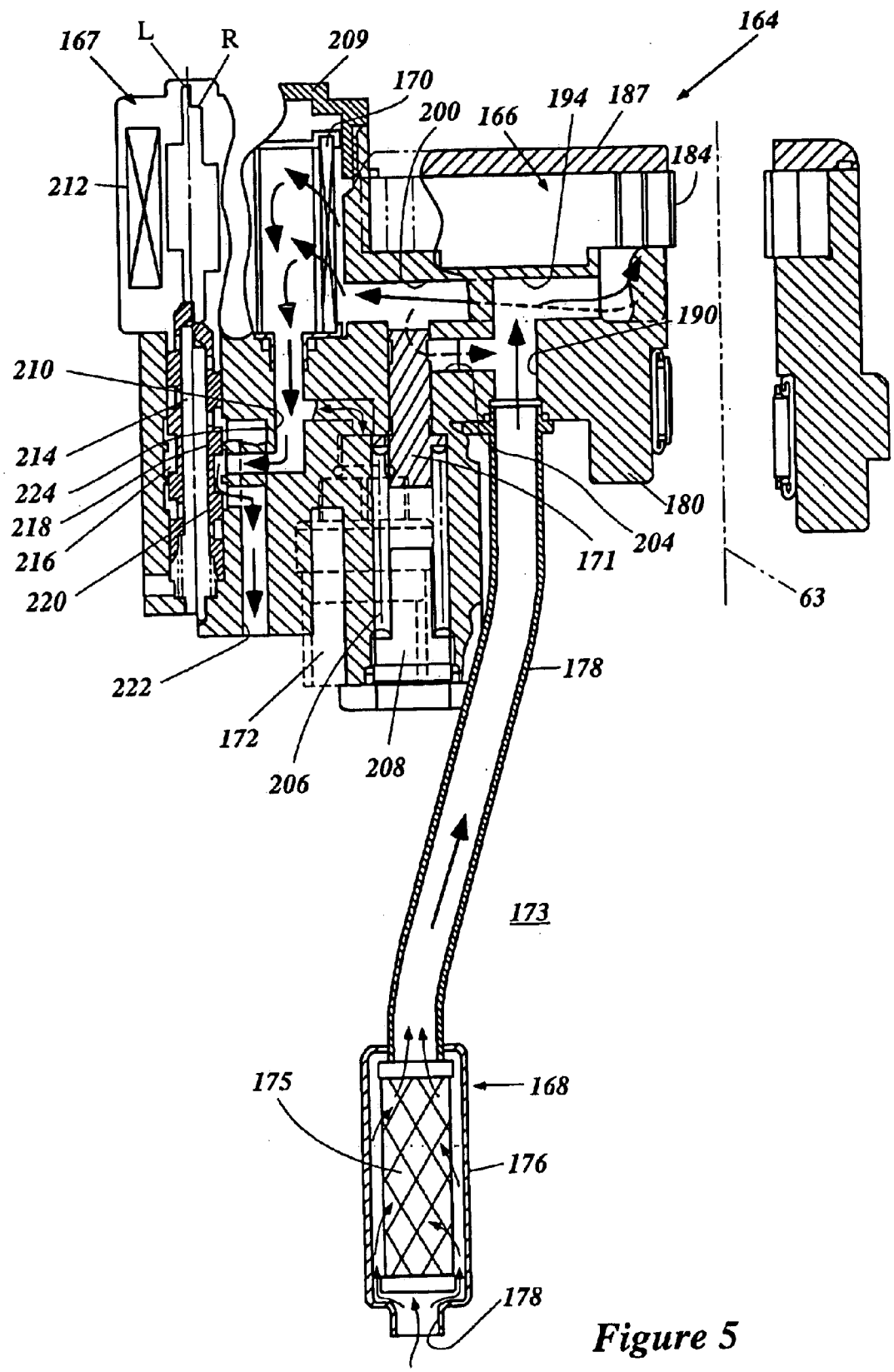
FIG. 5 is a schematic sectional view of a fluid pump assembly within the hydraulic control system of FIG. 4.

With reference to FIGS. 2–10, the hydraulic control system 160 will now be described below. The hydraulic control system 160 delivers a pressurized working fluid either to the forward or reverse clutch mechanism 108, 110, or to neither of them. For example, oil is applicable as the working fluid. The hydraulic control system 160 preferably comprises a fluid pump assembly 164. As best shown in FIG. 5, the illustrated fluid pump assembly 164 incorporates a pump unit 166, a shift actuator 167, a strainer unit 168, filter unit 170, a relief valve 171 and a fluid pressure sensor 172. Alternatively, those components 166, 168, 170, 171, 172 can be separately provided from each other. The fluid pump assembly 164 preferably is disposed in a cavity 173 defined within the lower unit 52 and is positioned generally in front of the driveshaft 62. The fluid pump assembly 164 can be inserted into the cavity 173 through a top opening of the lower unit 52 and can be affixed to the lower unit 52 by bolts that are screwed down into bolt holes 174 (FIGS. 6 and 7) of the fluid pump assembly 164. The cavity 173 communicates with the cavity 90 in which the gears 105, 106 and the hydraulic clutches 108, 110 are disposed. In the illustrated arrangement, the two cavities 90, 173 together define a working fluid reservoir. The pump unit 166 and the shift actuator 168 are placed generally atop the cavity 173 and the strainer unit 168 extends from a bottom portion of the cavity 173 toward the pump unit 166.

With particular reference to FIG. 5, the strainer unit 168 preferably comprises a strainer element 175, an element container 176 and a fluid pipe 178. The element container 176 contains the strainer element 175 therein. The container 176 defines a fluid inlet 178 at a bottom end thereof. The working fluid accumulates within the fluid reservoir (cavities 90, 173) such that a fluid surface is positioned at least higher than the fluid inlet 178. The fluid pipe 178 defines a fluid path and is coupled to a pump housing 180 of the pump unit 166. In the illustrated arrangement, the pump housing 180 substantially forms an entire housing of the fluid pump assembly 164 and defines the foregoing bolt holes 174. The working fluid in the fluid reservoir (cavities 90, 173) can enter the container 176 through the inlet 178. The strainer element 175 removes foreign substances from the working fluid. The working fluid then flows to the pump unit 166 through the fluid path defined by the fluid pipe 178.

Figure 6:
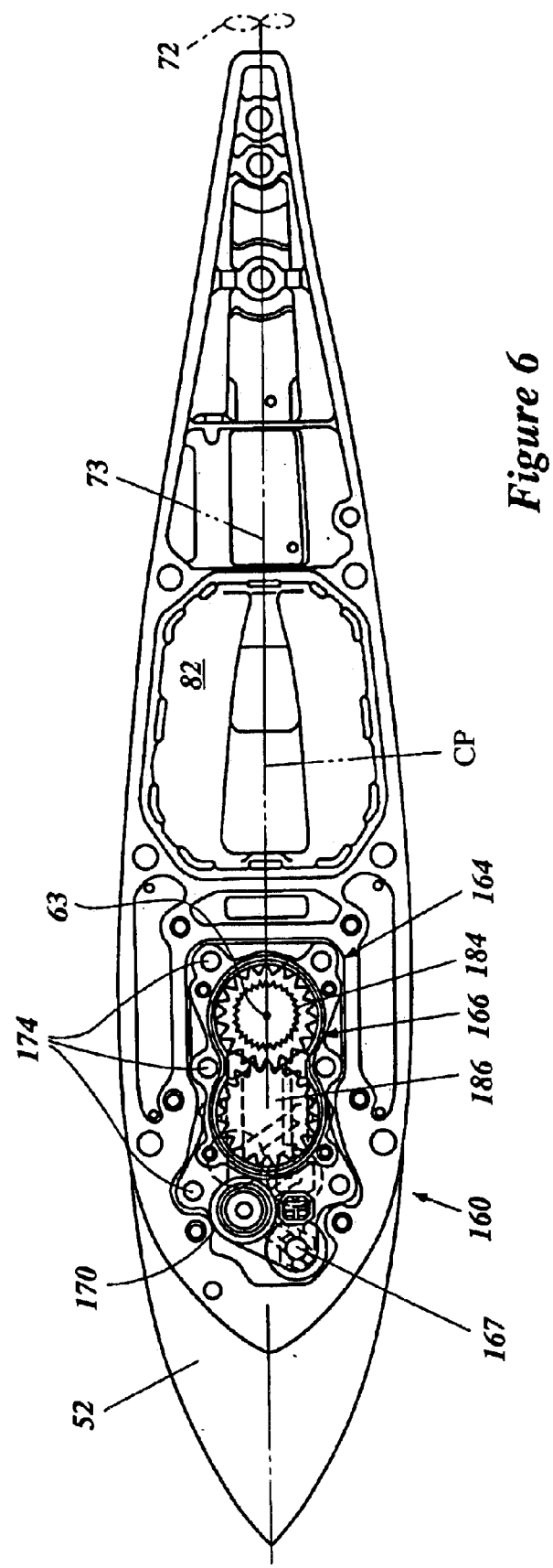
FIG. 6 is a top plan view of the lower unit of the outboard motor showing the hydraulic control system of FIG. 4.
Figure 7:
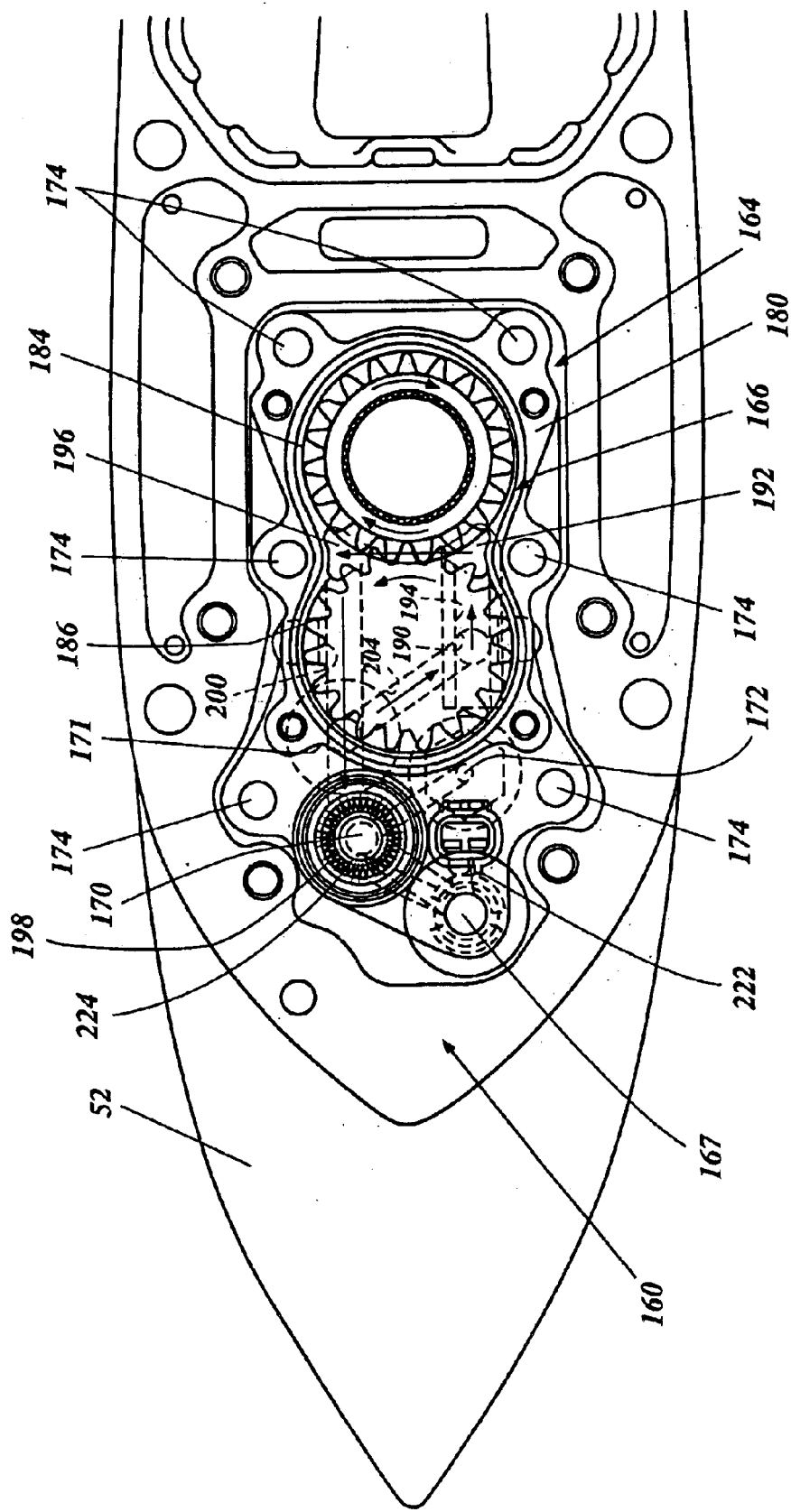
FIG. 7 is an enlarged top plan view of the lower unit of FIG. 6 showing the hydraulic control system more in detail.

With particular reference to FIGS. 5–7, the pump unit 166 preferably includes a gear pump that comprises a drive gear 184 and a driven gear 186 which are meshed with each other within the pump housing 180. A cover member 187 (FIG. 5) is affixed atop the pump housing 180 to enclose the drive and driven gears 184, 186 within the pump housing 180. As shown in FIG. 6, the drive and drive gears 184, 186 in the illustrated embodiment align along the vertical center plane CP such that the respective centers thereof are positioned on the center plane CP. The drive gear 184 preferably is coupled with the driveshaft 62 through a spline connection to be driven by the driveshaft 62. In the illustrated arrangement, the driven gear 186 is positioned in front of the drive gear 84.

As seen in FIGS. 5 and 7, the fluid path in the fluid pipe 178 communicates with an inlet path 190 defined by the pump housing 180. In the illustrated embodiment, the inlet path 190 communicates with a suction chamber 192 (FIG. 7) on the port side of the pump unit 166 through a suction path 194. The suction chamber 192 then communicates with a discharge chamber 196 on the starboard side of the pump unit 166 through a space defined among meshed gear teeth. The discharge chamber 196 communicates with a recess, in which a filter element 198 (FIG. 7) of the filter unit 170 is disposed, through a discharge path 200. The filter unit 170 preferably is a cartridge type and the entire unit 170 including the filter element 198 can be exchanged without the unit 170 disassembled.

When the drive gear 184 drives the driven gear 186, the suction chamber 192 suctions the working fluid in the fluid pipe 178 through the inlet path 190 and the suction path 194. The fluid is pressurized and delivered to the discharge chamber 196 because of the pumping function provided by the gear combination. The pressurized fluid goes to the recess for the filter unit 170 through the discharge path 200.

A return path 204 (FIG. 5) is formed next to the inlet path 190. The relief valve 171 is slidably disposed in a vertical hollow through which the return path 204 communicates with the discharge path. Normally, the relief valve 171 is urged to disconnect the return path 204 from the discharge path 200 by a bias spring 206, which is retained by a retainer screw 208. When a fluid pressure in the discharge path 200 is greater than a preset pressure, the relief valve 171 in the illustrated embodiment moves downwardly to connect the return path 204 with the discharge path 200. The fluid thus can flow back to the suction chamber 192 and the excess pressure can be relieved. In another variation, the fluid (or some portion thereof) can return to the fluid reservoir 173, 90 without directly moving back to the suction chamber 192. The fluid pressure thus is normally regulated equal to or under the preset pressure.

The fluid in the discharge path 200 moves to the recess for the filter unit 170 unless the fluid pressure exceeds the preset pressure. The pump housing 180 defines the recess together with a cap 209 which is detachably affixed to a top end of the pump housing 180 positioned generally next to the cover member 187. The filter element 198 thus is exchangeable when the cap 209 is detached. The entire working fluid passes through the filter element 198 and flows to an upstream control path 210 (FIG. 5). Thus, the filter unit 170 can further remove foreign substances from the working fluid before the fluid proceeds to a next stage.

With particular reference to FIG. 5, the shift actuator 167 is disposed in the next stage. The shift actuator 167 preferably is a solenoid valve that comprises a solenoid coil 212 and a piston valve 214. A vertical hollow 216 is defined within the pump housing 180 and a lower portion of the piston valve 214 is slidably supported within the vertical hollow 216. Of course, other types of actuators (e.g., stepper or servo-motors) can be used to move the piston valve. FIG. 5 schematically illustrates the piston valve 214 by showing the piston valve divided into two halves, a right half R and a left half L. Each half illustrates one of the valve's operating positions, as explained below.

Upper and lower flanges 218, 220 are formed on the lower portion of the piston valve 214. The illustrated piston valve 214 has three stop positions corresponding to the forward, neutral and reverse positions of the transmission 74. Stop positions of the piston valve 214 depend on where the flanges 218, 220 are positioned in connection with the pair of down stream control paths 222, 224. In other words, with the axial movement of the valve 214, the upstream control path 210 selectively communicates with either the downstream control path 222 or the downstream control path 224, or with neither of these control paths 222, 224.

When the piston valve 214 is in a position such that the lower flange 220 closes an inlet port of the downstream control path 222 and also the upper flange 218 closes an inlet port of the downstream control path 224, the upstream control path 210 communicates with neither of the downstream control paths 222, 224. The working fluid does not flow downstream and returns to the suction chamber 192. This condition corresponds to the neutral condition of the transmission 74.

When the piston valve 214 moves downwardly from the previous position (neutral position), the lower flange 220 moves below the opening to the downstream control path 222. This movement connects the downstream control path 222 with the upstream control path 210. The movement also moves the upper flange 218 into a position blocking the downstream control path 224 so as to disconnect the downstream control path 224 from the upstream control path 210. The working fluid thus moves from the upstream control path 210 to the downstream control path 222. The half portion R on the right hand side of the piston valve 214 of FIG. 5 illustrates this condition. The condition corresponds to the forward condition of the transmission 74.

When the piston valve 214 moves upwardly from the neutral position to a position such that the lower flange 220 blocks the downstream control path 222 from the upstream control path 210 and the upper flange 218 moves above the downstream control path 224 so as to open the downstream control path 224, the working fluid moves from the upstream control path 210 to the downstream control path 224. The half portion L on the left hand side of the piston valve 214 of FIG. 5 illustrates this condition. The condition corresponds to the reverse condition of the transmission 74.

An upper portion of the piston valve 214 is disposed within the solenoid coil 212. The axial movement of the piston valve 214 is made when the solenoid coil 212 is energized. In some arrangements, a biasing mechanism can urge the piston valve 214 to the neutral position when the solenoid coil 212 is not energized.

A control device (not shown) preferably is provided to control the solenoid coil 212 for the selective movement of the piston valve 214. An electronic control unit (ECU), which normally can control engine operations such as, for example, an operation of a fuel injection device, is applicable as the control device.

Preferably, a shift lever is provided within the associated watercraft. The shift lever preferably is pivotally or axially movable among forward, neutral and reverse positions. The operator can actuate the shift lever toward one of these positions. The movement of the shift lever generates a shift signal that is sent to the ECU through a proper signal line. Normally, the shift actuation is made under the condition that the engine speed is reduced to or running at a low speed.

Preferably, the pump unit 166 has a sufficient capacity to pressurize a larger amount of the working fluid than an amount that the shift actuator 167 allows to pass therethrough. Thus, actually, a large amount of excess fluid returns to the pump unit 166 through the relief valve 171 even under the forward or reverse conditions.

Figure 9:
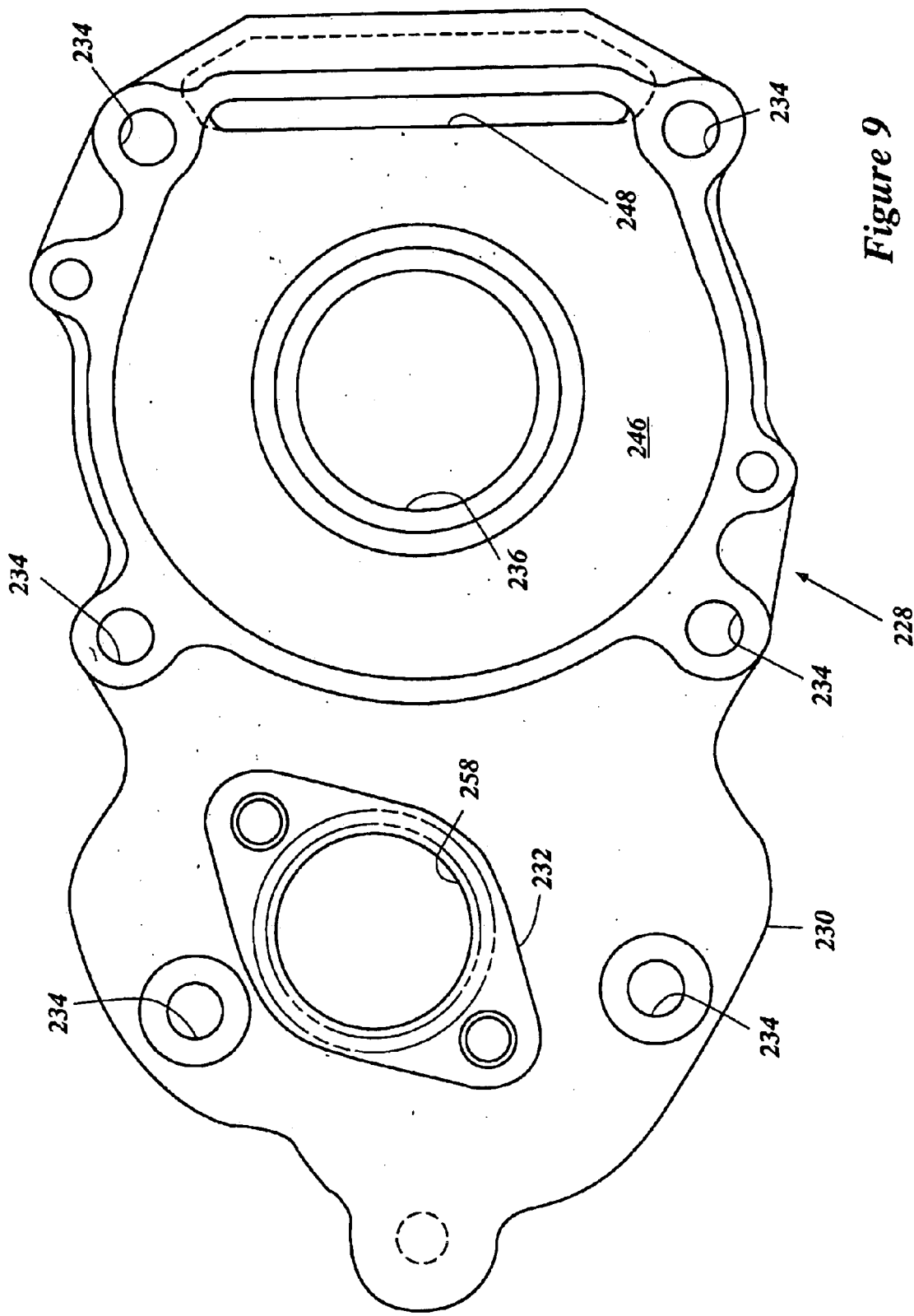
FIG. 9 is a top plan view of a partition separating the lower unit from the driveshaft housing of the outboard motor.
Figure 10:
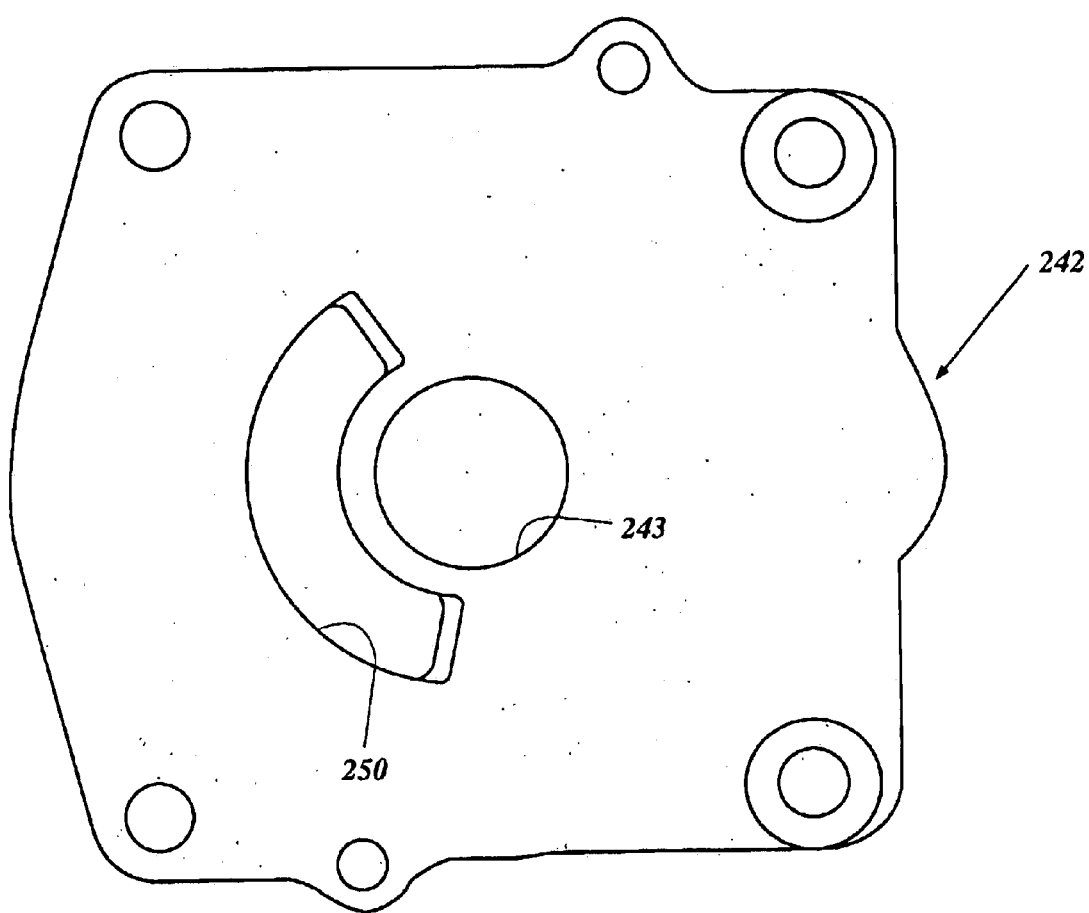
FIG. 10 is a metal plate which forms a portion of the cooling water supply system of FIG. 4.

With reference to FIGS. 4, 9 and 10, the cavity 173 that encloses the fluid pump assembly 164 preferably is covered by a closure member or partition 228. The illustrated closure member 228 comprises a closure section 230 and a cap section 232. The closure member 228 is affixed to a top surface area of the lower unit 52 existing inside of the driveshaft housing 50 by a plurality of bolts at bolt holes 234.

The closure section 230 defines an opening 236 and the driveshaft 62 extends through the opening 236. Seal members 238 seal around the driveshaft 62 within the opening 236.

The water pump 88 is disposed just above the closure member 228. A generally circular projection 240 extends toward the water pump 88 from a top surface of the closure section 230. A metal plate 242 is interposed between a bottom end of the water pump 88 and the circular projection 240. The metal plate 242 preferably is affixed to a bottom portion of the water pump 88. The metal plate 242 defines an opening 243 (FIG. 10) through which the driveshaft 62 extends. The metal plate 242 forms a space 244 together with a portion 246 of the closure section 230 surrounded by the circular projection 240.

The closure section 230 defines a slit 248 above the water delivery passage 87 of the lower unit 52. The space 244 thus communicates with the water delivery passage 87 through the slit 248. The metal plate 242, on the other hand, defines a slit 250 and the space 244 also communicates with the inside of the water pump 88 through the slit 250. Accordingly, the water in the water delivery passage 87 of the lower unit 52 is drawn into the space 244 and further into the water pump 88 and then is pressurized to a water delivery passage 252 of the driveshaft housing 50 when the water pump 88 is driven by the driveshaft 62.

In the illustrated embodiment, the cap section 232 is provided to close another opening 258 defined by the closure section 230. The opening 258 is positioned above the shift actuator 167 and can be used, for example, to exchange the filter elements 224 without detaching the closure member 228. The cap section 232 is affixed to the closure section 230 by bolts 259.

The illustrated hydraulic control system 160 also comprises a forward fluid delivery passage 260 and a reverse fluid delivery passage 262. Preferably, the forward and reverse fluid delivery passages 260, 262 are defined generally vertically and linearly in a forward wall portion of the lower unit 52. Such delivery passages 260, 262 can be bored by a machining process. An upper end of the forward fluid delivery passage 260 communicates with the downstream control path 222, while an upper end of the reverse fluid delivery passage 262 communicates with the downstream control path 224.

With reference to FIGS. 2 and 3, the illustrated hydraulic control system 160 further comprises a forward fluid supply passage 266 and a reverse fluid supply passage 268. Preferably, the forward and reverse fluid supply passages 266, 268 extend generally axially (i.e., parallel to the shaft axis) within the propeller shaft 72 and symmetrically relative to the center axis 73 of the propulsion shaft 72. This is advantageous because the weight balance of the propulsion shaft 72 can be generally maintained when the propulsion shaft 72 rotates. The supply passages 266, 268 can be bored by a machining process. Closure plugs 270 preferably close respective forward ends of the supply passages 266, 268.

The cylindrical member 104 defines fluid paths connecting the fluid delivery paths 260, 262 to the fluid supply paths 266, 268. Preferably, a pair of circular grooves 274, 276 is formed on an outer surface of the cylindrical member 104 at locations corresponding to the fluid delivery passages 260, 262. A plurality of apertures 278 also is formed at a bottom of the respective grooves 274, 276. The apertures 278 open at an outer surface of the propulsion shaft 72. The fluid supply passages 266, 268 also have grooves 280, 282 at location corresponding to the grooves 274, 276. Thus, the forward delivery passage 260 in the lower unit 52 communicate with the forward supply passage 266 in the propulsion shaft 72 through the grooves 274, 280 and the apertures 278 in the groove 274. Also, the reverse delivery passage 262 in the lower unit 52 communicate with the reverse supply passage 268 in the propulsion shaft 72 through the grooves 276, 282 and the apertures 278 in the groove 276.

The forward gear 105 defines a fluid pathway 286. The propulsion shaft 72 is formed to have a slightly small outer diameter at a location next to the fluid pathway 286 and defines an aperture 288 opening to a space around the small diameter portion. The fluid pathway 286 opens to this space. The forward fluid supply passage 266 thus communicates with a fluid chamber 290 that is formed behind the piston 128 through the aperture 288 and the fluid pathway 286. In the illustrated arrangement, the fluid pathway 286 comprises a circular groove 292 and a plurality of apertures 294 that both are formed generally normal to each other by a machining process. A generally circular groove can replace the apertures 294.

The reverse gear 106 similarly defines a fluid pathway 298 in the reverse gear 106. The propulsion shaft 72 is formed to have a slightly small outer diameter at a location next to the fluid pathway 298 and defines an aperture 300 opening to a space around the small diameter portion. The fluid pathway 298 opens to this space. The reverse fluid supply passage 268 thus communicates with a fluid chamber 302 that is formed in front of the piston 134 through the aperture 300 and the fluid pathway 298. In the illustrated arrangement, the fluid pathway 298 comprises a circular groove 304 and a plurality of apertures 306 both are formed generally normal to each other by a machining process. A generally circular groove can replace the apertures 306.

As thus arranged, when the working fluid is allotted to neither of the downstream control paths 222, 224 of the pump housing 166, the working fluid does not flow to either the front fluid chamber 290 or the rear fluid chamber 302. Both the pistons 128, 134 stay generally at their initial positions because of the biasing force of the bias springs 132, 138 and because the clutch mechanisms 108, 110 are not actuated. The transmission 74 thus is in the neutral position.

When the working fluid is allotted to the downstream control path 222 by the shift actuator 167, the working fluid flows to the front fluid chamber 290 through the forward fluid delivery passage 260 of the lower unit 52 and the forward fluid supply passage 266 of the propulsion shaft 72. The piston 128 thus moves forwardly to press the disc unit 130 toward the stopper 133. The transmission 74 thus is shifted to the forward position. When the working fluid supply is stopped, the piston 128 returns to its initial position by the bias spring 132 and the disc unit 130 is relieved from being pressed to the stopper 133 and from being compressed. The transmission thus returns to the neutral position.

When the working fluid is allotted to the downstream control path 224 by the shift actuator 167, the working fluid goes to the rear fluid chamber 302 through the reverse fluid delivery passage 262 of the lower unit 52 and the reverse fluid supply passage 268 of the propulsion shaft 72. The piston 134 thus moves rearward to press the disc unit 136 toward the stopper 140. The transmission 74 thus is shifted to the reverse position. When the working fluid supply is stopped, the piston 134 returns to its initial position by the bias spring 138 and the disc unit 136 is relieved from being pressed to the stopper 140 and from being compressed. The transmission thus returns to the neutral position.

With reference to FIG. 3, the cavity 90 in which the propulsion shaft 72 is accommodated preferably is formed by casting and machining processes. In these processes, a front space 307 may be formed and remains as an empty space in front of the propulsion shaft 72. The working fluid may leak to the front space 307 en route to the fluid supply passages 266, 268 from the fluid delivery passages 260, 262 because the supply passages 266, 268 and the delivery passages 260, 262 are connected with each other through the circular grooves 274, 276 and the apertures 278 defined in the cylindrical member 104. That is, the working fluid can move to the front space 307 through nominal spaces formed between the cylindrical member 104 and the lower unit 52 or between the cylindrical member 104 and the propulsion shaft 72. The fluid can accumulate within the front space 307 for a relatively long period of time and produces a relatively large magnitude of pressure. The pressure can affect the operations of the clutch mechanisms 108, 110. Particularly, the pressure can inhibit the working fluid in the fluid chambers 290, 302 from smoothly leaving therefrom. If this phenomenon occurs, the shift operation may be difficult.

In order to improve the shift operation, a pressure relief path 308 preferably is formed within the propulsion shaft 72. The working fluid accumulated in the front space can move to the fluid reservoir 90, 173 from the front space 307. In addition, while the relief path can be formed in the lower unit housing, the relief path 308 preferably is formed within the propulsion shaft 72 so as to simplify the structure of the outboard motor.

Figure 8:
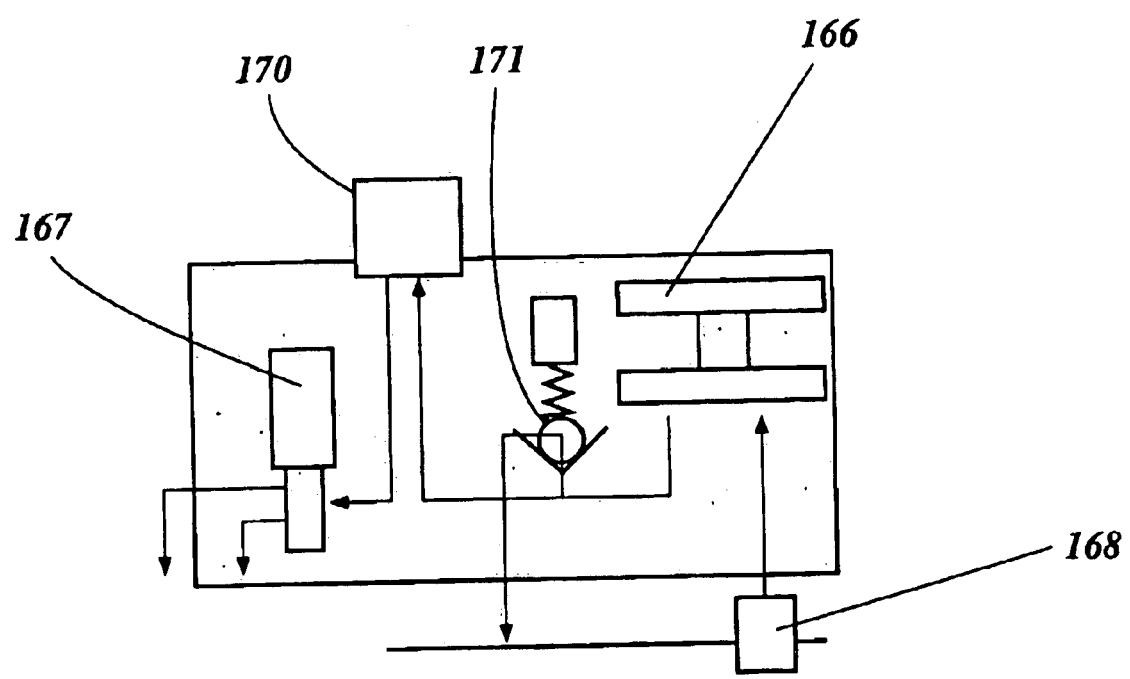
FIG. 8 is a diagram of the hydraulic control system of FIG. 4.

FIG. 8 schematically illustrates the flow of the working fluid. The fluid within the fluid reservoir 173, 90 is suctioned to the fluid pump 166 as indicated by the arrow 310. The fluid is pressurized and delivered to the filter unit 170, as indicated by the arrow 312 and then goes to the shift actuator 167, as indicated by the arrow 314. If the shift actuator 167 is under the neutral condition, the fluid is not allowed to pass through the shift actuator 167 and is returned to the fluid reservoir 173, 90 as indicated by the arrow 316, because the relief valve 171 opens the return path. Otherwise, the fluid can directly recirculate to the fluid pump 166 as described above. If, the shift actuator 167 is under the forward condition, the fluid flows to the forward clutch mechanism 108 through the foregoing fluid paths and passages as indicated by the arrows 318, 320, 322, 324 to actuate the forward clutch mechanism 108. If, on the other hand, the shift actuator 167 is under the reverse condition, the fluid flows to the reverse clutch mechanism 110 through the foregoing fluid paths and passages as indicated by the arrows 326, 328, 330, 332 to actuate the reverse clutch mechanism 110.

As thus described, the illustrated clutch mechanisms 108, 110 are hydraulically operated. Shock and noise that may occur when a transmission is shifted to either forward or reverse position are greatly reduced in comparison to prior dog clutch transmission systems.

In the illustrated arrangement, the clutch mechanisms 108, 110 are disposed within the lower unit 52 that is always submerged when the outboard motor 30 is in an operable position. Thus, the clutch mechanisms 108, 110 and the working fluid advantageously are sufficiently cooled by the body of water; however, the transmission can be located elsewhere in the outboard motor and these components can be cooled by the cooling system.

Because the illustrated working fluid accumulates within the cavities 90, 173, the fluid acts as lubricant oil to lubricate the transmission 74 including the forward and reverse gears 105, 106 and the propulsion shaft 72. Alternatively, the working fluid can be reserved in a separate reservoir or tank.

The illustrated fluid supply passages 266, 268 are positioned in the forward area of the propulsion shaft 72. In this layout, the delivery passages 260, 262 are advantageously disposed within the lower unit 52. Other layouts, however, are also practicable.

Because the fluid delivery passages 260, 262 and the fluid supply passages 266, 268 are formed within the lower unit 52 and the propulsion shaft 72, respectively, special fluid conduits are not necessary and the outboard motor 30 can be compact and will not be heavier. In addition, relatively small connections are only needed to connect separate portions in the illustrated arrangement and, thus , fluid leak can be reduced.

The illustrated clutch mechanisms 108, 110 are spaced apart from each other by the forward and reverse gears 105, 106. The heat produced by each clutch mechanism 108, 110 is not easily transmitted to one another. In addition, because the fluid chambers 290, 302 also are spaced apart from one another, leak of fluid, if any, will not affect the other fluid chamber 290, 302.

In the illustrated arrangement, the extended outer cylindrical sections 114, 115 of the forward and reverse gears 105, 106 define outer rings of the disc units 130, 136, respectively. The construction of the clutch mechanisms 108, 110 thus is simple. Additionally, the pistons 128, 134 can have a relatively large area and accordingly the pressure applied by the pistons 128, 134 can be large.

The clutch mechanisms 108, 110 are disposed generally along the axis 73 of the propulsion shaft 72. Thus, the lower unit 52 does not need to have protruding portions. Water resistance as the outboard motor 30 travels through the water thus does not increase in this arrangement.

The clutch mechanisms 108, 110 can be subassembled with the forward and reverse gears 105, 106 before being mounted onto the propulsion shaft 72. Manufacturing processes of the outboard motor 30 accordingly can be simple.

In the foregoing arrangement that is best shown in FIG. 3, the thrust force can transmit to the lower unit 52 from the propulsion shaft 72 through the flange 100 or the circular clip 101, the coupling member 96, 98 and the thrust bearing 92, 94, and not through the forward or reverse gear 105, 106. The arrangement is advantageous because the thrust force does not affect the forward and reverse gear 105, 106 and the forward and clutch mechanisms 108, 110.

The illustrated hydraulic control system 160 is quite simple because the shift actuator 167 is electrically operated. The shift actuator 167 does not need cumbersome and complicated mechanical constructions.

Such electrically operable shift actuators can bring various controls. For instance, if the piston valve 214 can have multiple positions to change sizes of the communicating openings between the upstream and downstream control paths in response to output signals from the fluid pressure sensor 172, the hydraulic pressure to the clutch mechanisms 108, 110 and eventually the transmission torque thereof can be changed step by step. Otherwise, a duty ratio control of the solenoid coil 212 based upon the signals from the fluid pressure sensor 172 can bring generally the same results. Thereby, trolling speeds can be lowered. In addition, an automatic transmission can be realized such that the transmission torque is changed with the engine speed being kept under the optimum condition.

Figure 11:
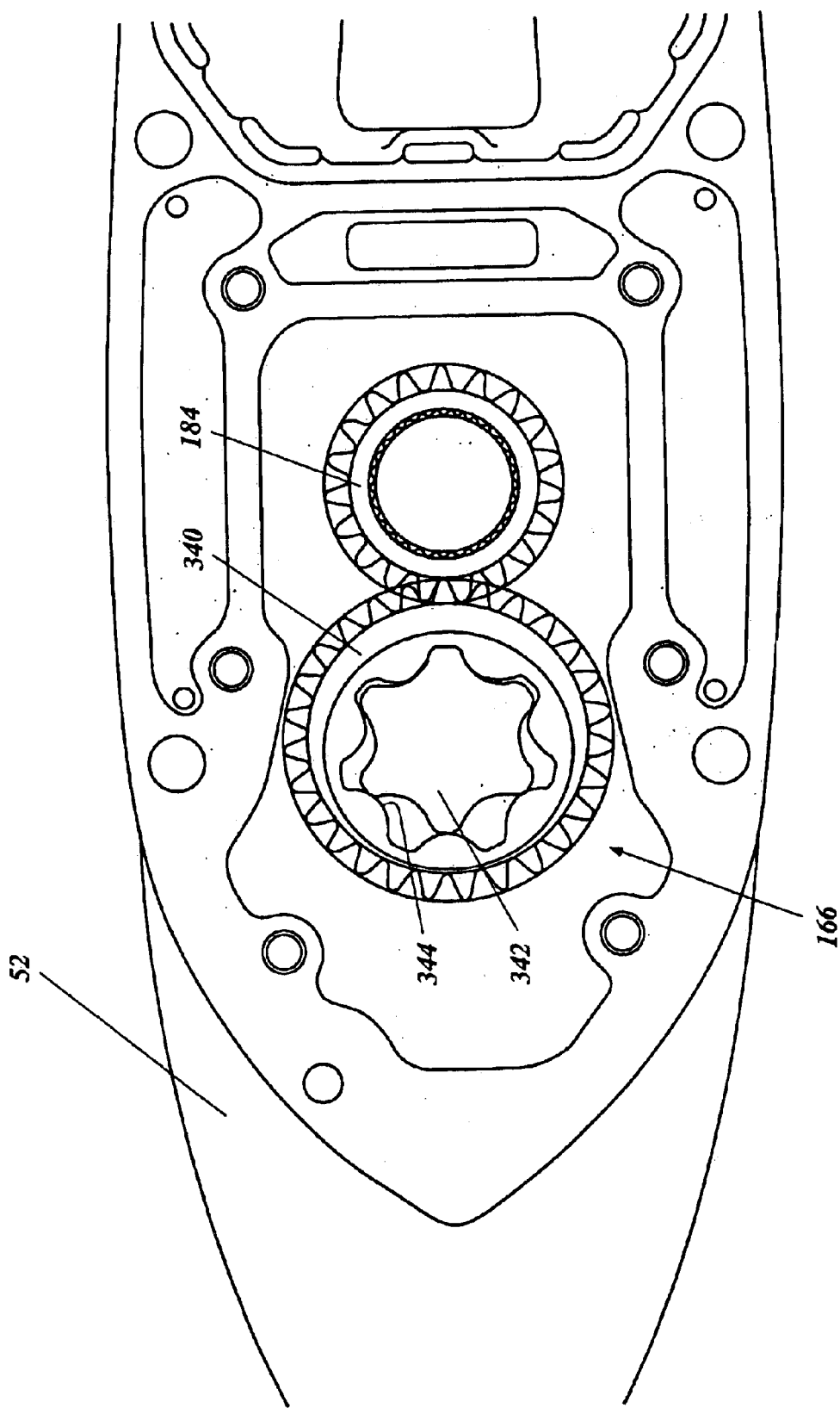
FIG. 11 is an enlarged top plan view of a modified hydraulic control system.

With reference to FIG. 11, the pump unit 166 can be a trochoid pump. The trochoid pump comprises a driven gear 340 meshed with the drive gear 184 and a rotor 342. In the illustrated embodiment, the driven gear 340 defines internally seven projections which are off-centered from a rotational axis of the drive gear 340. The rotor 342 is rotatably disposed within an inner cavity defined by the driven gear 340 and defines six projections that forms, together with the seven projections of the driven gear 340, pumping spaces 344. Respective volumes of the spaces 344 can change with the rotor 342 rotating. The spaces 344 are connected to the suction path 190 and the discharge path 200. Accordingly, the trochoid pump can suction the fluid from the suction path 190 and pressurize the fluid and delivery it to the discharge path 200.

Figure 12:
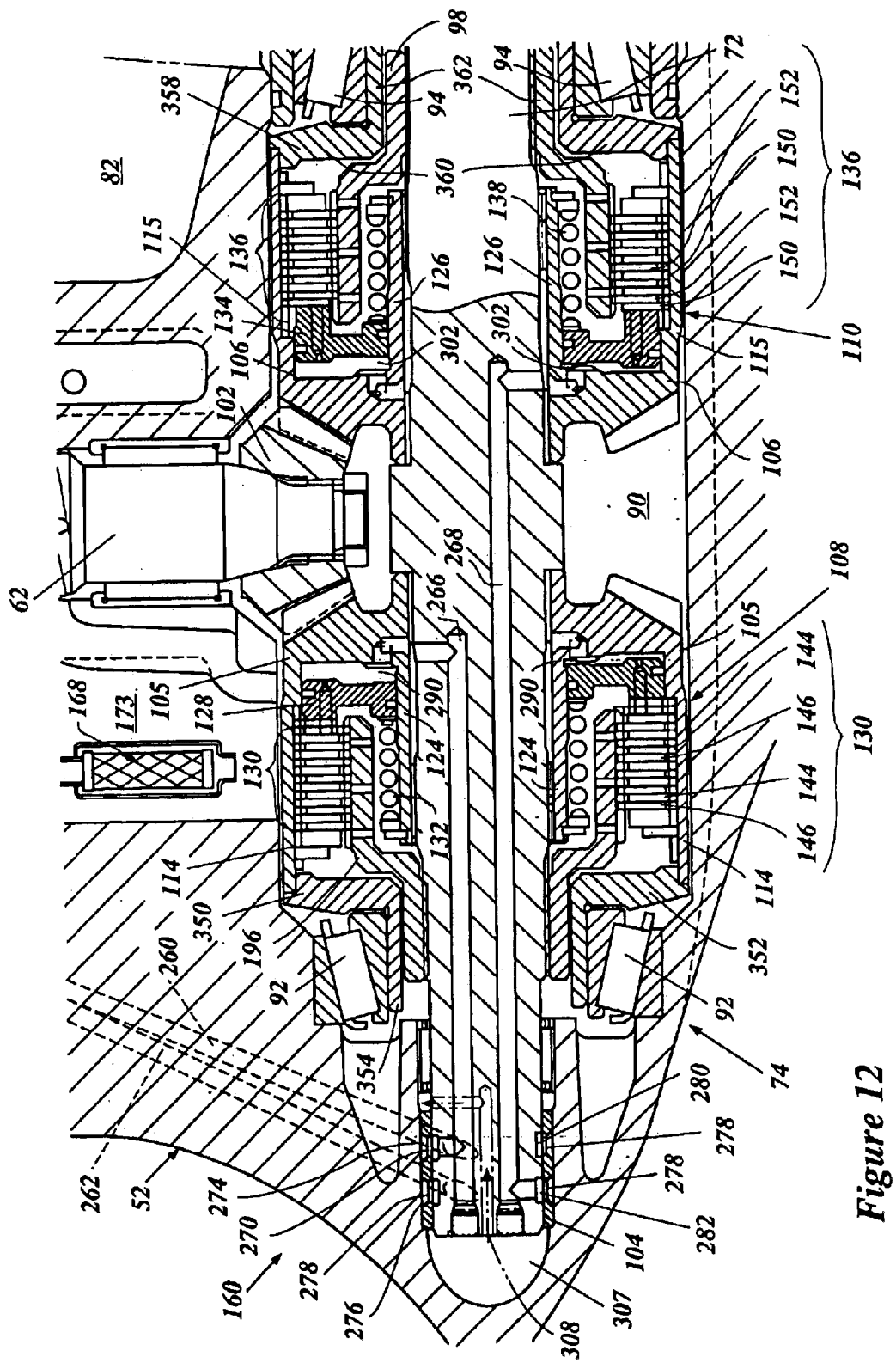
FIG. 12 is an enlarged cross-sectional view of another outboard motor showing modified transmission and shift mechanism.

FIG. 12 illustrates a modified arrangement of the transmission 74. The same members, components and units between the embodiment described above and the embodiment illustrated in FIG. 12 are assigned the same reference numerals, and the prior description of such members, components and units shall also apply to the present embodiment, unless indicated otherwise.

In this arrangement, the forward end of the forward gear 105 is coupled with a thrust receiving member 350. The thrust receiving member 350 defines radial and axial portions 352, 354 extending generally normal to each other. The axial portion 354 has an outer diameter smaller than an inner diameter of the thrust bearing 92. The thrust receiving member 350 engages the thrust bearing 92 generally at a corner where the radial and axial portions 352, 354 intersect. The thrust force thus is transmitted to the lower unit 52 through the forward gear 105, the thrust receiving member 350 and the thrust bearing 92.

The rear end of the reverse gear 106 is coupled with a thrust receiving member 358. The thrust receiving member 358 defines radial and axial portions 360, 362 extending generally normal to each other. The axial portion 362 has an outer diameter smaller than an inner diameter of the thrust bearing 94. The thrust receiving member 358 engages the thrust bearing 94 generally at a corner where the radial and axial portions 360, 362 intersect. The thrust force thus is transmitted to the lower unit 52 through the reverse gear 106, the thrust receiving member 358 and the thrust bearing 94.

The modified arrangement can include a special stabilizing construction for the forward and reverse gears 105, 106 and/or the forward and reverse clutch mechanisms 108, 110, because the thrust force can affect the forward and reverse gears 105, 106 and/or the forward and reverse clutch mechanisms 108, 110. Actually, the load that either the forward or the reverse gear 105, 106 and/or either the forward or reverse clutch mechanisms 108, 110 should bear changes, for example, in a range zero to 2,000 kgf.

Figure 13:
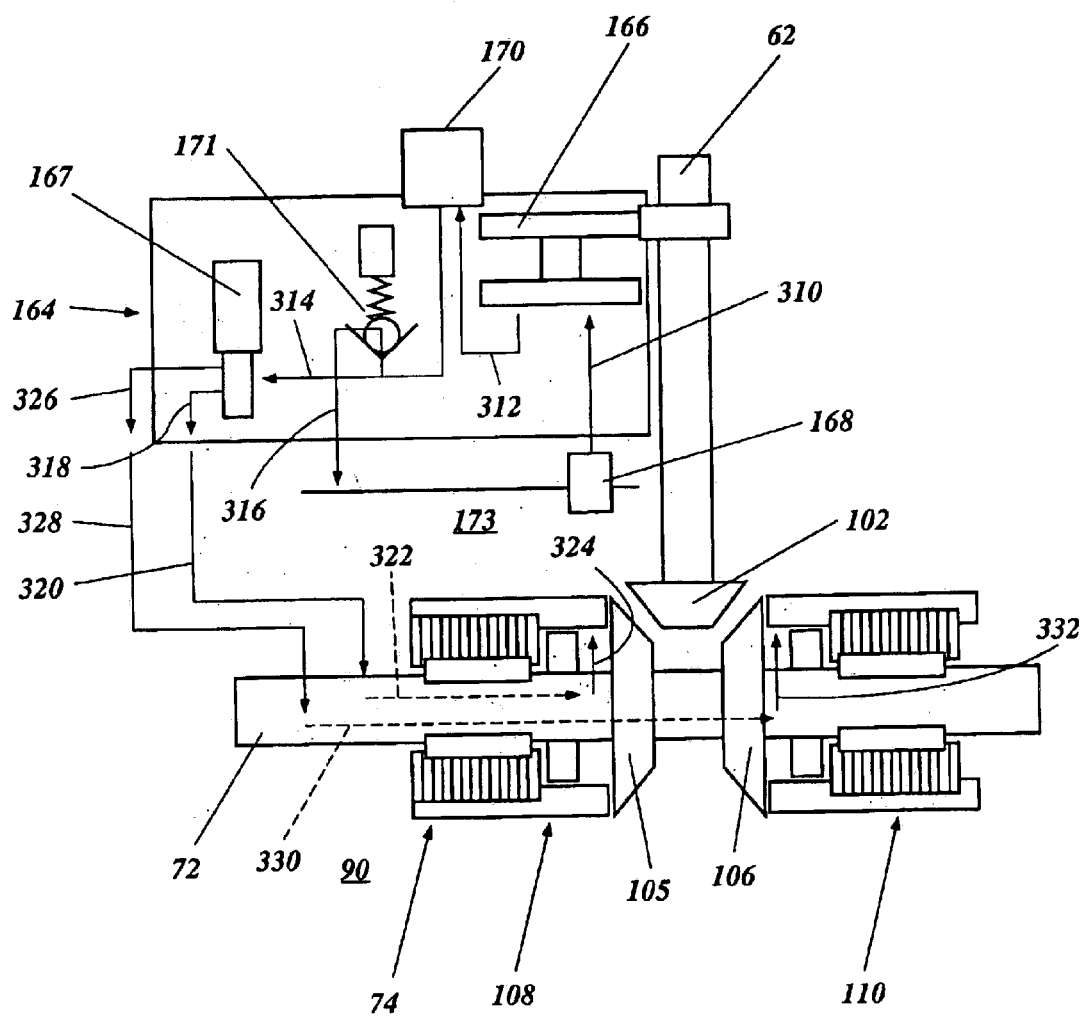
FIG. 13 is a diagram of a further modified hydraulic control system. A portion of the system in the transmission and the shift mechanism is omitted in this FIG.
Figure 14:
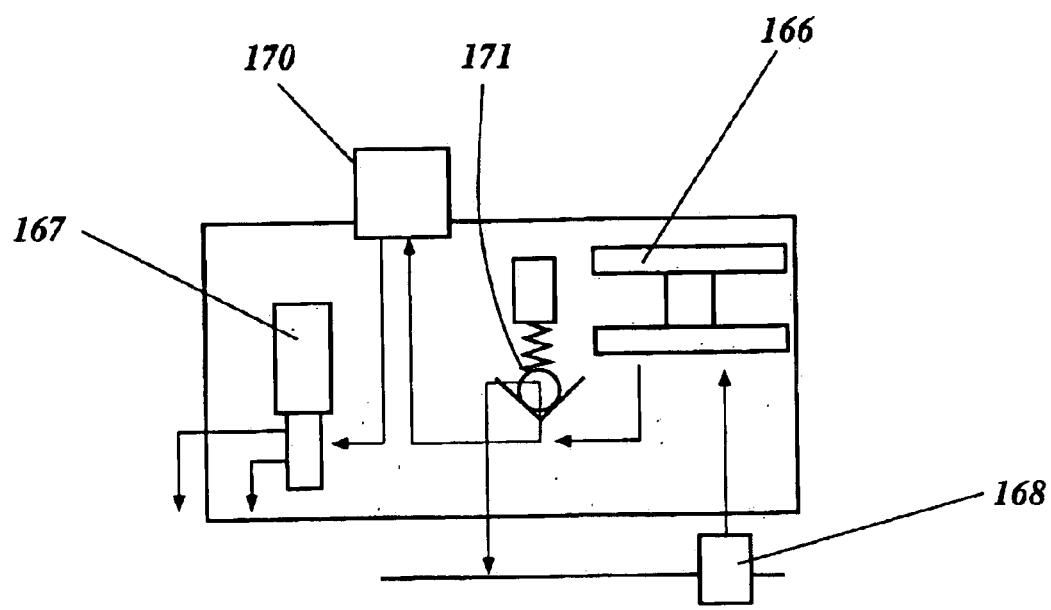
FIG. 14 is a diagram view of the hydraulic control system of FIG. 8 showing a flow of a working fluid therein.
Figure 15:
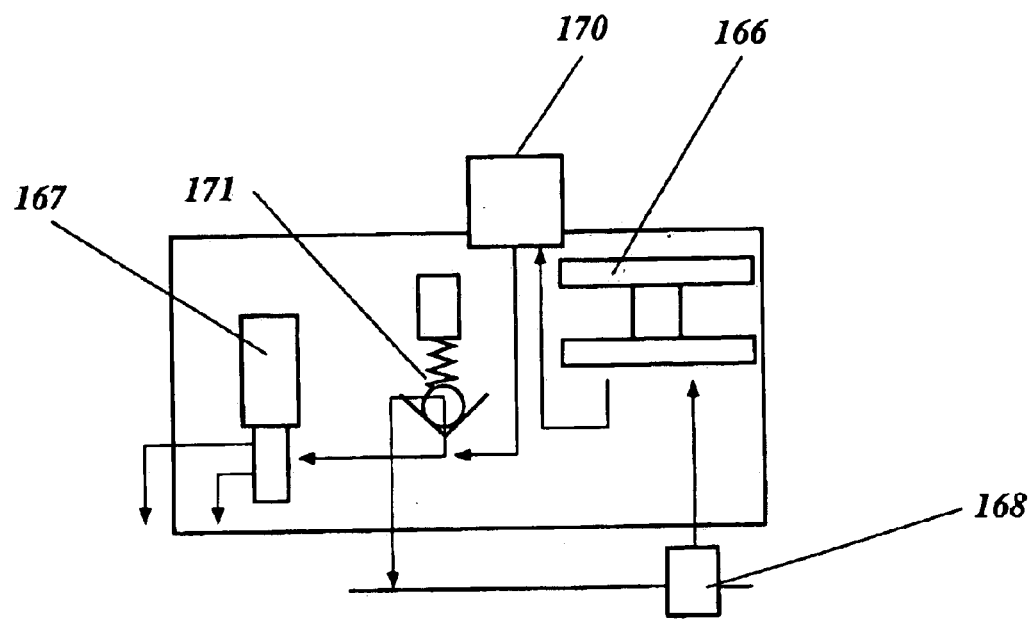
FIG. 15 is a diagram of the hydraulic control system of FIG. 13 showing a flow of a working fluid therein.

With reference to either FIGS. 13 or 15, the fluid filter 170 can be disposed upstream of the relief valve 171 (FIGS. 13 and 15 illustrate substantially the same arrangement). This modified arrangement, however, is less advantageous than the arrangement illustrated in FIG. 14 (which is substantially the same as the arrangement described above with reference to FIGS. 4–8). The arrangement shown in FIG. 14 has the fluid filter 170 disposed downstream of the relief valve 171.

One of the advantages of the embodiment illustrated in FIG. 14 is that the filter unit 170 can be compact. As noted above, a relatively large amount of the fluid returns to the fluid reservoir 173, 90 or the fluid pump 166 through the relief valve 171. Accordingly, in the arrangement of FIG. 15, the total fluid flow from the pump must pass through the filter before at least some of it is returned through the relief valve 171. Thus, the filter unit 170 thus has a relatively large volume to accommodate such a large amount of fluid flow. On the other hand, however, a small amount of the fluid goes to the filter unit 170 in the arrangement of FIG. 14 because the large amount of the fluid has already returned to the fluid reservoir (cavities 173, 90) or to the fluid pump 166 upstream of the filter unit 170 and the clutch mechanisms 108, 110 require the rest of the fluid that can fill either fluid chamber 290, 302, i.e., the displacement volume of the piston 128, 134, and a nominal amount corresponding to a leak amount.

Figure 16:
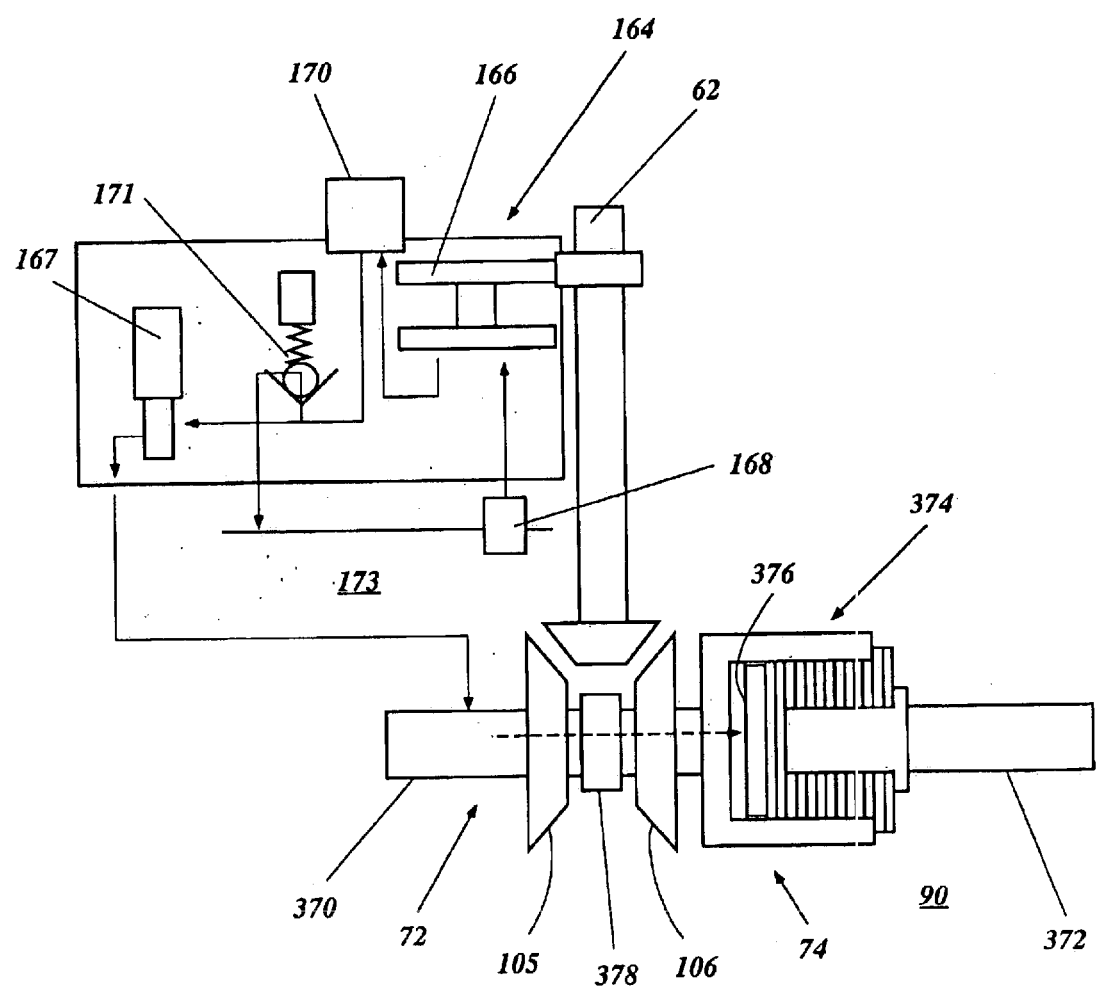
FIG. 16 is a diagram showing another combination of a transmission and a hydraulic control system.

FIG. 16 illustrates another combination of a transmission and a hydraulic control system. Like the other modified embodiments, like members, components and units between the embodiments have been assigned the same reference numbers, and the foregoing description of such members, components, and units should also apply to the present embodiment unless indicated otherwise.

In this combination, the propulsion shaft 72 is divided into forward and rear sections 370, 372. The forward and rear sections 370, 372 can be coupled with each other in the rear of the reverse gear 106 through a hydraulic clutch mechanism (a multiple disc clutch) 374 that is similar to the forward or reverse clutch mechanism 108, 110. The clutch mechanism 374 has a hydraulic piston 376. When a working fluid is delivered behind the piston 376, the clutch mechanism 374 connects the rear section 372 of the propulsion shaft 72 to the forward section 370 thereof. If those sections 372, 374 are disconnected, the transmission 74 is in the neutral position. If those sections 372, 374 are connected, the transmission 74 can be under either the forward or reverse condition. A shift to the forward or reverse position from the neutral position can be done through a conventional dog clutch mechanism. That is, a clutch member 378 is axially movably disposed on the forward section 370 between the forward and reverse gears 105, 106. The clutch member 378 can engage either the forward or reverse gear 105, 106 by rectangular teeth when the member 378 moves to the associated gear 105, 106 and be coupled with the associated gear 105, 106 so that the propulsion shaft 72 rotates in either the forward or reverse direction.

Although this invention has been disclosed in the context of certain preferred embodiments, variations and examples, it will be understood by those skilled in the art that the present invention extends beyond the specifically disclosed embodiments to other alternative embodiments and/or uses of the invention and obvious modifications and equivalents thereof. In particular, while the present transmission has been described in the context of particularly preferred embodiments, the skilled artisan will appreciate, in view of the present disclosure, that certain advantages, features and aspects of the engine may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims that follow.

What is claimed is:

1. A marine propulsion unit comprising a prime mover, a first shaft disposed underneath the prime mover during operation and driven by the prime mover, a second shaft driven by the first shaft, the second shaft driving a propulsion device, the first shaft carrying a first gear, the second shaft carrying second and third gears, the first gear always meshing with the second and third gears, the first gear driving the second and third gears in opposite directions relative to each other, a first hydraulic clutch mechanism configured to couple the second gear with the second shaft, a second hydraulic clutch mechanism configured to couple the third gear with the second shaft, and a hydraulic control system selectively operating either the first hydraulic clutch mechanism or the second hydraulic clutch mechanism, a fluid pump configured to pressurize a working fluid for at least one of the first and second hydraulic clutch mechanisms, an axis of the first shaft extending generally vertically within a vertical plane, the vertical plane also passing through the fluid pump and the propulsion device, wherein the first shaft drives the fluid pump.

2. A marine propulsion unit comprising a prime mover, a first shaft driven by the prime mover, a second shaft driven by the first shaft, the second shaft driving a propulsion device, the first shaft carrying a first gear, the second shaft carrying second and third gears, the first gear always meshing with the second and third gears, the first gear driving the second and third gears in opposite directions relative to each other, a first hydraulic clutch mechanism configured to couple the second gear with the second shaft, a second hydraulic clutch mechanism configured to couple the third gear with the second shaft, and a hydraulic control system selectively operating either the first hydraulic clutch mechanism or the second hydraulic clutch mechanism, the first hydraulic clutch mechanism being coupled with the hydraulic control system through a first fluid passage, the second hydraulic clutch mechanism being coupled with the hydraulic control system through a second fluid passage, at least a portion of the first fluid passage or a portion of the second fluid passage being defined within the second shaft.

3. The marine propulsion unit as set forth in claim 2, wherein the portion of the first or second fluid passage is positioned at a location in the second shaft opposite to the propulsion device.

4. The marine propulsion unit as set forth in claim 1, wherein the first hydraulic clutch mechanism is positioned next to the first gear, the second hydraulic clutch mechanism is positioned next to the second gear.

5. The marine propulsion unit as set forth in claim 4, wherein the first and second hydraulic mechanisms together interpose the second and third gears therebetween.

6. The marine propulsion unit as set forth in claim 1, wherein at least one of the first and second hydraulic clutch mechanisms includes multiple discs.

7. The marine propulsion unit as set forth in claim 6, wherein a portion of the second gear or the third gear extends to form a retainer that holds the multiple discs.

8. The marine propulsion unit as set forth in claim 7, wherein the retainer defines a space, the multiple discs are disposed in the space, the first or second clutch mechanism additionally includes a piston axially movable along the second shaft toward the discs in the space.

9. The marine propulsion unit as set forth in claim 7, wherein the portion of the second or third gear comprises outer and inner cylindrical sections extending coaxially, the multiple discs are embraced between the outer and inner cylindrical sections.

10. The marine propulsion unit as set forth in claim 1, wherein the fluid pump is positioned opposite to the propulsion device relative to the first shaft.

11. A marine propulsion unit comprising a prime mover, a first shaft driven by the prime mover, a second shaft driven by the first shaft, the second shaft driving a propulsion device, the first shaft carrying a first gear, the second shaft carrying second and third gears, the first gear always meshing with the second and third gears, the first gear driving the second and third gears in opposite directions relative to each other, a first hydraulic clutch mechanism configured to couple the second gear with the second shaft, a second hydraulic clutch mechanism configured to couple the third gear with the second shaft, a hydraulic control system selectively operating either the first hydraulic clutch mechanism or the second hydraulic clutch mechanism, a fluid pump configured to pressurize a working fluid for at least one of the first and second hydraulic clutch mechanisms, an axis of the first shaft extending generally vertically within a vertical plane, the vertical plane also passing through the fluid pump and the propulsion device, and an exhaust system defining a conduit that extends generally parallel to the first shaft, and the fluid pump being positioned on a side of the first shaft opposite to the conduit of the exhaust system.

12. The marine propulsion unit as set forth in claim 1 additionally comprising a housing enclosing at least one of the first and second shafts, the first hydraulic clutch mechanism being coupled with the hydraulic control system through at least a first fluid passage, the second hydraulic clutch mechanism being coupled with the hydraulic control system through at least a second fluid passage, at least a portion of the first fluid passage or a portion of the second fluid passage being internally defined within a body of the housing.

13. The marine propulsion unit as set forth in claim 1 additionally comprising a fluid pump configured to pressurize a working fluid for the first and second hydraulic clutch mechanisms, and a housing enclosing at least the first shaft and the fluid pump, the housing comprising a first housing section and a second housing section, the first shaft extending through the first and second housing sections, the fluid pump being positioned within the second housing section.

14. A marine propulsion unit comprising a prime mover, a first shaft driven by the prime mover, a second shaft driven by the first shaft, the second shaft driving a propulsion device, the first shaft carrying a first gear, the second shaft carrying second and third gears, the first gear always meshing with the second and third gears, the first gear driving the second and third gears in opposite directions relative to each other, a first hydraulic clutch mechanism configured to couple the second gear with the second shaft, a second hydraulic clutch mechanism configured to couple the third gear with the second shaft, a hydraulic control system selectively operating either the first hydraulic clutch mechanism or the second hydraulic clutch mechanism, a fluid pump configured to pressurize a working fluid for the first and second hydraulic clutch mechanisms, a housing enclosing at least the first shaft and the fluid pump, the housing comprising a first housing section and a second housing section, the first shaft extending through the first and second housing sections, the fluid pump being positioned within the second housing section, and a coolant pump that supplies coolant to the prime mover, the coolant pump being formed around the first shaft within the first housing section, and a partition separating the fluid pump and the coolant pump from each other, the first shaft extending through the partition.

15. The marine propulsion unit as set forth in claim 14, wherein the partition forms a portion of a coolant passage that communicates with the coolant pump.

16. The marine propulsion unit as set forth in claim 1 additionally comprising a fluid pump configured to pressurize a working fluid for the first and second hydraulic clutch mechanisms, the fluid pump and at least control valve of the hydraulic control system being assembled together so as to form a module.

17. The marine propulsion unit as set forth in claim 1, wherein the second shaft extends generally normal to the first shaft.

18. The marine propulsion unit as set forth in claim 1, wherein the hydraulic control system comprises a valve movable between a plurality of positions and operating between a source of pressurized working fluid and the hydraulic clutch mechanisms, and the valve disconnects the source of pressurized working fluid from both of said first and second hydraulic clutch mechanisms when positioned in at least one of said plurality of positions.

19. A marine propulsion unit comprising a first shaft, a second shaft selectively driven by the first shaft to drive a propulsion device, a first gear carried by the first shaft, a second gear carried by the second shaft and continuously driven by the first gear, a hydraulic clutch mechanism operating between the second gear and the second shaft so as to drivingly couple the second gear with the second shaft, a hydraulic control system selectively actuating the hydraulic clutch mechanism, the hydraulic clutch mechanism being coupled with the hydraulic control system through a fluid passage, at least a portion of the fluid passage being defined within the second shaft, and a prime mover configured to drive the first shaft, a fluid pump configured to pressurize a working fluid for the hydraulic clutch mechanism, a coolant pump configured to supply coolant to the prime mover, and a partition arranged to separate the fluid pump and the coolant pump from each other, the first shaft extending through the partition.

20. The marine propulsion unit as set forth in claim 19, wherein the second shaft supports the second gear.

21. A marine propulsion unit comprising a first shaft, a second shaft selectively driven by the first shaft to drive a propulsion device, a first gear carried by the first shaft, a second gear carried by the second shaft and continuously driven by the first gear, a hydraulic clutch mechanism operating between the second near and the second shaft so as to drivingly couple the second gear with the second shaft, a hydraulic control system selectively actuating the hydraulic clutch mechanism, the hydraulic clutch mechanism being coupled with the hydraulic control system through a fluid passage, at least a portion of the fluid passage being defined within the second shaft, and a third gear supported by the second shaft and continuously driven by the first gear, and another hydraulic clutch mechanism operating between the third gear and the second shaft, the hydraulic control system selectively actuating the hydraulic clutch mechanism, wherein the second shaft supports the second gear.

22. The marine propulsion unit as set forth in claim 19, wherein the hydraulic clutch mechanism comprises multiple discs, a portion of the second gear extends to form a retainer that holds the multiple discs.

23. The marine propulsion unit as set forth in claim 19 additionally comprising a fluid pump configured to pressurize a working fluid for the hydraulic clutch mechanism, an axis of the first shaft extending generally vertically within a vertical plane, the fluid pump being disposed on the vertical plane.

24. A marine propulsion unit comprising a first shaft, a second shaft selectively driven by the first shaft to drive a propulsion device, a first gear carried by the first shaft, a second rear carried by the second shaft and continuously driven by the first gear, a hydraulic clutch mechanism operating between the second gear and the second shaft so as to drivingly couple the second sear with the second shaft, a hydraulic control system selectively actuating the hydraulic clutch mechanism, the hydraulic clutch mechanism being coupled with the hydraulic control system through a fluid passage, at least a portion of the fluid passage being defined within the second shaft, and a fluid pump configured to pressurize a working fluid for the hydraulic clutch mechanism, an engine driving the first shaft, and an exhaust conduit through which exhaust gases from the engine pass, the fluid pump and the exhaust conduit being positioned opposite to each other relative to the first shaft.

25. The marine propulsion unit as set forth in claim 19 additionally comprising a housing configured to enclose the first and second shafts, the hydraulic clutch mechanism being coupled with the hydraulic control system through a fluid passage, at least a portion of the fluid passage being internally defined within a body of the housing.

* * * * *

UNITED STATES PATENT AND TRADEMARK OFFICE
CERTIFICATE OF CORRECTION

PATENT NO. : 6,884,131 B2 Page 1 of 1
APPLICATION NO. : 10/346320
DATED : April 26, 2005
INVENTOR(S) : Goichi Katayama It is certified that error appears in the above-identified patent and that said Letters Patent is hereby corrected as shown below:

At Page 1, Column 1 (Assignee) item (73), Line 2, please delete "Shizuoka (JP)" and insert therefore, --1400 Nippashi, Hamamatsu Shizuoka 432-8528 (JP)--.

At Column 19, Line 48, in Claim 16, after "at least" please insert --a--.

At Column 20, Line 21, in Claim 21, please delete "near" and insert therefore, --gear--.

At Column 20, Line 46, in Claim 24, please delete "rear" and insert therefore, --gear--.

At Column 20, Line 49, in Claim 24, please delete "sear" and insert therefore, --gear--.

Signed and Sealed this

Thirtieth Day of January, 2007

JON W. DUDAS
*Director of the United States Patent and Trademark Office*